(12) United States Patent
Mohr et al.

(10) Patent No.: US 10,679,311 B2
(45) Date of Patent: *Jun. 9, 2020

(54) SYSTEMS AND METHODS FOR MANAGING A TRANSPORTATION PLAN

(71) Applicant: United Parcel Service of America, Inc., Atlanta, GA (US)

(72) Inventors: Douglas K. Mohr, Crestwood, KY (US); Anthony Michael Celmer, Baldwin, MD (US); Kristina M. McGowan, Jarrettsville, MD (US); Keith Alan Ware, Louisville, KY (US); James Murphy, Croton on Hudson, NY (US); Chi-yin Cheng, Crestwood, KY (US); Lee Anthony Mitchell, New Albany, IN (US); Jessica Myers, Goshen, KY (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 510 days.

This patent is subject to a terminal disclaimer.

(21) Appl. No.: 15/017,038

(22) Filed: Feb. 5, 2016

(65) Prior Publication Data

US 2017/0228694 A1    Aug. 10, 2017

Related U.S. Application Data

(63) Continuation of application No. 15/016,889, filed on Feb. 5, 2016.

(51) Int. Cl.
*G06Q 10/00* (2012.01)
*G06Q 50/28* (2012.01)
(Continued)

(52) U.S. Cl.
CPC ......... *G06Q 50/28* (2013.01); *G01C 21/3407* (2013.01); *G06Q 10/08355* (2013.01); *G06Q 10/1097* (2013.01)

(58) Field of Classification Search
CPC .............. G06Q 50/28; G06Q 10/1097; G06Q 10/08355; G01C 21/3407
See application file for complete search history.

(56) References Cited

U.S. PATENT DOCUMENTS 5,546,542 A * 8/1996 Cosares .................. H04J 3/085
370/258
5,758,329 A * 5/1998 Wojcik ................ G06Q 10/087
705/28

(Continued)

OTHER PUBLICATIONS

"Dynamic routing for priority shipments in LTL service networks", RK Cheung, B Muralidharan—Transportation science, 2000—pubsonline.informs.org (Year: 2000).*

(Continued)

*Primary Examiner* — Jonathan G Sterrett
(74) *Attorney, Agent, or Firm* — Shook, Hardy & Bacon, L.L.P.

(57) ABSTRACT

Methods, systems, apparatus, and computer program products are provided. In an example embodiment, a method is provided comprising receiving input identifying load information corresponding to a load to be inserted into a transportation plan. The transportation plan comprises a plurality of transportation schedules, each schedule comprising a plurality of transportation movements. The method further comprises identifying an available movement network comprising portions of transportation schedules having open capacity, each portion of a transportation schedule having open capacity being a potential leg of a path from the origin location to the destination location; determining potential solutions for transporting the load from the origin location to (Continued)

the destination location by combining one or more legs to determine a path of open capacity movements from the origin location to at least part way to the destination location; and providing one or more potential solutions for display via a user interface.

7 Claims, 16 Drawing Sheets

(51) Int. Cl.
  *G06Q 10/10* (2012.01)
  *G06Q 10/08* (2012.01)
  *G01C 21/34* (2006.01)

(56) References Cited

U.S. PATENT DOCUMENTS

| | | | |
|---|---|---|---|
| 5,880,958 A | 3/1999 | Helms et al. | |
| 6,741,927 B2* | 5/2004 | Jones | G06Q 10/08 340/989 |
| 6,748,320 B2* | 6/2004 | Jones | G06Q 10/08 340/989 |
| 7,257,552 B1* | 8/2007 | Franco | G06Q 10/08 705/26.2 |
| 7,672,855 B2 | 3/2010 | Peterkofsky et al. | |
| 7,765,120 B2 | 7/2010 | Yadappanavar et al. | |
| 7,979,359 B1 | 7/2011 | Young et al. | |
| 8,386,397 B1* | 2/2013 | Agarwal | G06Q 10/083 705/330 |
| 8,572,001 B2 | 10/2013 | Hollis | |
| 9,218,635 B2* | 12/2015 | Shoemaker | G06Q 10/08 |
| 9,864,634 B2* | 1/2018 | Kenkre | G06F 9/50 |
| 9,958,272 B2* | 5/2018 | Morris, IV | G01C 21/00 |
| 2002/0019759 A1* | 2/2002 | Arunapuram | G06Q 10/04 705/7.26 |
| 2003/0014286 A1* | 1/2003 | Cappellini | G06Q 10/02 705/5 |
| 2003/0060924 A1 | 3/2003 | Ye et al. | |
| 2005/0021346 A1 | 1/2005 | Nadan et al. | |
| 2005/0114190 A1* | 5/2005 | Pandit | G06Q 10/047 705/7.26 |
| 2005/0209913 A1* | 9/2005 | Wied | G06Q 10/08 705/12 |
| 2005/0278063 A1* | 12/2005 | Hersh | G06Q 10/06311 700/216 |
| 2006/0235739 A1* | 10/2006 | Levis | G06Q 10/08 705/1.1 |
| 2007/0016363 A1* | 1/2007 | Huang | G08G 1/202 701/533 |
| 2009/0094084 A1 | 4/2009 | Rempel et al. | |
| 2010/0332273 A1 | 12/2010 | Balasubramanian et al. | |
| 2011/0099121 A1 | 4/2011 | Holley et al. | |
| 2014/0046585 A1* | 2/2014 | Morris, IV | G01C 21/00 701/468 |
| 2014/0180956 A1 | 6/2014 | Arunapuram et al. | |
| 2014/0180957 A1* | 6/2014 | Arunapuram | G06Q 10/08355 705/338 |
| 2014/0180958 A1 | 6/2014 | Arunapuram et al. | |
| 2015/0046363 A1* | 2/2015 | McNamara | G06Q 10/0833 705/333 |
| 2016/0019497 A1* | 1/2016 | Carvajal | G06Q 10/08 701/519 |
| 2016/0104111 A1* | 4/2016 | Jones | G06Q 10/08345 |
| 2016/0379168 A1* | 12/2016 | Foerster | G06Q 10/08355 705/7.16 |
| 2017/0046658 A1* | 2/2017 | Jones | G06Q 10/08355 |
| 2017/0086011 A1* | 3/2017 | Neves | H04W 4/005 |
| 2018/0349849 A1 | 12/2018 | Jones et al. | |

OTHER PUBLICATIONS

"Software Tools and Emerging Technologies for Vehicle Routing and Intermodal Transportation", O Bräysy, G Hasle—Vehicle Routing: Problems, Methods,and . . . , 2014—books.google.com (Year: 2014).* https://en.wikipedia.org/wiki/SGI_Indigo, retrieved from the web May 22, 2018 (Year: 2018).*

State of the Practice: A Review of the Application of OR/MS in Freight Transportation MF Gorman, JP Clarke, AH Gharehgozli, M Hewitt . . . — . . . , 2014—pubsonline.informs.org (Year: 2014).*

*Descartes Family of Sites.* TMS Systems | Intermodal Shopping | Transportation Management, Descartes, 2017, www.descartes.com. Accessed Jan. 12, 2017.

Hall, Randolph W., et al., "Control of vehicle dispatching on a cyclic route serving trucking terminals", *Transportation Research Part A: Policy and Practice*, Mar. 2002, pp. 257-276, vol. 36, Issue 3, Elsevier Science Ltd, U.K.

International Searching Authority, International Search Report and Written Opinion for International Application No. PCT/US2016/056501, dated Jan. 9, 2017, 13 pages, United States Patent and Trademark Office, U.S.A.

*MJC2 Family of Sites.* Distribution of Software | Logistics Planning | Delivery Schedule Optimization, MJC2, 2015, www.mjc2.com. Accessed Jan. 12, 2017.

Final Office Action received for U.S. Appl. No. 15/017,050, dated Sep. 24, 2019, 25 pages.

* cited by examiner

FIG. 5

LOAD TO BE INSERTED:

LOAD IDENTIFIER: ———— 502

ORIGIN LOCATION: ———— 504

AVAILABLE TIME TO LEAVE: ———— 506

DESTINATION LOCATION: ———— 508

REQUIRED ARRIVE TIME: ———— 510

LOAD SIZE:
- ONE PALLET
- PARTIAL LOAD (LESS THAN HALF TRAILER)
- PARTIAL LOAD (MORE THAN HALF TRAILER)
- SMALL TRAILER
- LARGE TRAILER
———— 512

LOAD WEIGHT: ———— 514

SPECIAL HANDLING: ———— 516

SUBMIT ———— 518

500

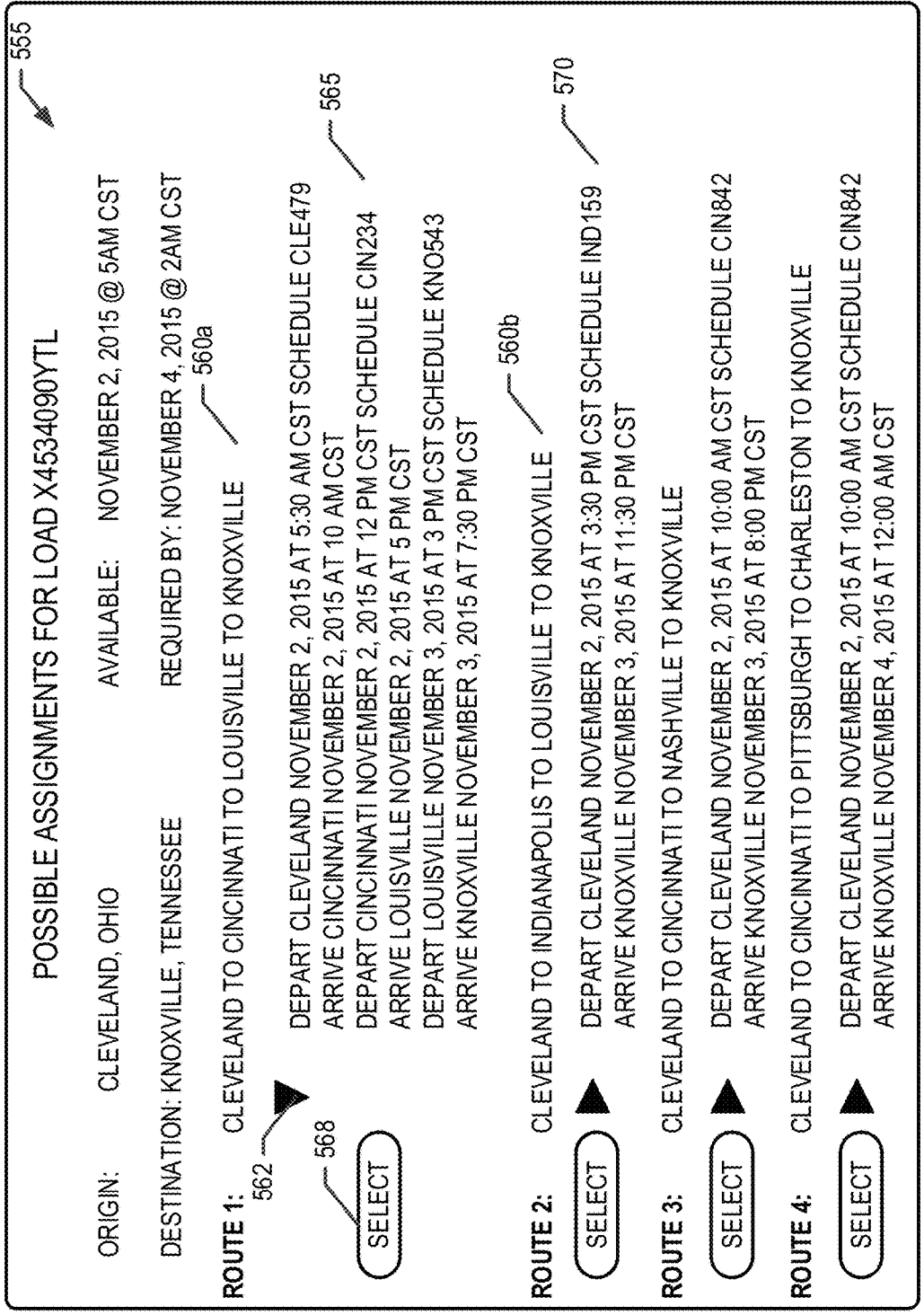

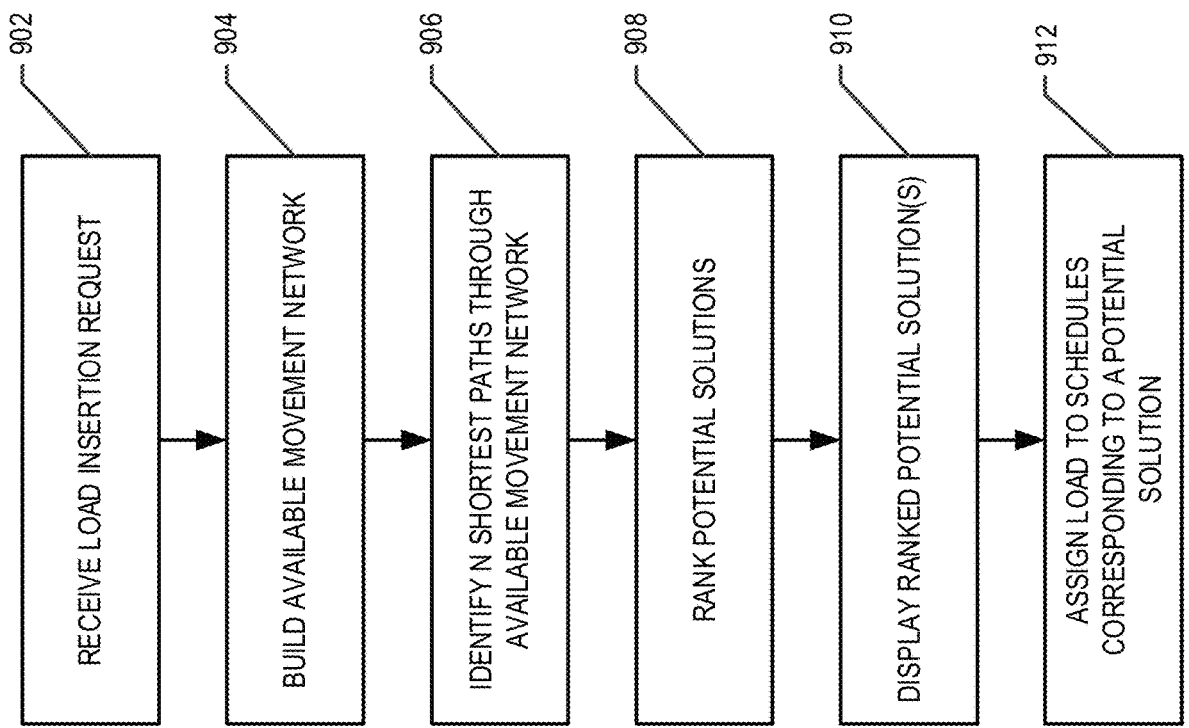

FIG. 11

DELETE SCHEDULE(S)

DATE: NOVEMBER 2, 2015 — 1105

SCHEDULE IDENTIFIER: ATL* — 1110

NUMBER OF SCHEDULES TO BE DELETED:
1
2
3
HOW MANY CAN BE DELETED? — 1120

SUBMIT — 1130

1100

SYSTEMS AND METHODS FOR MANAGING A TRANSPORTATION PLAN

CROSS-REFERENCE TO RELATED APPLICATIONS

This patent application is a continuation of U.S. patent application Ser. No. 15/016,889, filed Feb. 5, 2016, which is incorporated herein by reference in its entirety.

BACKGROUND

The transportation of loads, freight, less-than-trailer loads, pallets, packages, items, and/or the like (referred to herein interchangeably as loads) by a carrier is often completed through one or more transportation networks associated with one or more carriers. The transportation network (s) may comprise a plurality of "hubs" between which the loads may be transported. A transportation plan is used to facilitate movement of the loads through the transportation network(s) from the load's origin location to the load's destination location. For example, a transportation plan may comprise a plurality of schedules, each schedule representing the work to be completed by a driver or other associate of the carrier. Each load may be assigned to one or more schedules indicating when and how the load will be transported through the carrier's transportation network(s). In various situations, a load may need to be inserted into the transportation plan, or a schedule may need to be deleted from the transportation plan. For example, if a driver calls in sick, the schedule associated with the driver for that day may need to be deleted and the loads assigned to that schedule will need to be accommodated by other schedules.

Thus, a need exists in the art for methods, apparatuses, systems, and computer program products for updating a transportation plan by inserting a load into a transportation plan, deleting a schedule from a transportation plan, identifying schedules that may be deleted from a transportation plan without affecting the carrier's ability to transport a set of loads through a transportation network, and/or the like.

BRIEF SUMMARY

In general, embodiments of the present invention provide methods, apparatus, systems, computing devices, computing entities, and/or the like for updating a transportation plan. For example, various embodiments of the present invention provide a tool for the insertion of loads into a transportation plan, the deletion of schedules from a transportation plan, and/or other updates of a transportation plan.

According to one aspect of the present invention, a method for inserting a load into a transportation plan is provided. In an example embodiment, the method comprises receiving input identifying load information corresponding to a load to be inserted into a transportation plan. The transportation plan comprises a plurality of transportation schedules each schedule comprising a plurality of transportation movements. The load information comprises (i) an origin location, (ii) a destination location, (ii) a leave time, and (iv) an arrive time. The method further comprises identifying an available movement network comprising portions of transportation schedules having open capacity, each portion of a transportation schedule having open capacity being a potential leg of a path from the origin location to the destination location. The open capacity of a transportation schedule is available via a direct, indirect, or movement added modification of the transportation schedule. The method further comprises determining one or more potential solutions for transporting the load from the origin location to the destination location by combining one or more legs to determine a path of open capacity movements from the origin location to at least part way to the destination location; and providing at least one of the one or more potential solutions for display via a user interface.

According to another aspect of the present invention, an apparatus is provided. In an example embodiment, the apparatus comprises at least one processor and at least one memory including program code. The at least one memory and the program code configured to, with the processor, cause the apparatus to at least receive input identifying load information corresponding to a load to be inserted into a transportation plan. The transportation plan comprises a plurality of transportation schedules each schedule comprising a plurality of transportation movements. The load information comprises (i) an origin location, (ii) a destination location, (ii) a leave time, and (iv) an arrive time. The at least one memory and the program code are further configured to, with the processor, cause the apparatus to at least identify an available movement network comprising portions of transportation schedules having open capacity, each portion of a transportation schedule having open capacity being a potential leg of a path from the origin location to the destination location. The open capacity is available via a direct, indirect, or movement added modification of the transportation schedule. The at least one memory and the program code are further configured to, with the processor, cause the apparatus to at least determine one or more potential solutions for transporting the load from the origin location to the destination location by combining one or more legs to determine a path of open capacity movements from the origin location to at least part way to the destination location; and provide at least one of the one or more potential solutions for display via a user interface.

According to yet another aspect of the present invention, a computer program product is provided. In an example embodiment, the computer program comprises at least one non-transitory computer-readable storage medium having computer-readable program code portions stored therein. The computer-readable program code portions comprise an executable portion configured to receive input identifying load information corresponding to a load to be inserted into a transportation plan. The transportation plan comprises a plurality of transportation schedules each schedule comprising a plurality of transportation movements. The load information comprises (i) an origin location, (ii) a destination location, (ii) a leave time, and (iv) an arrive time. The computer-readable program code portions further comprise an executable portion configured to identify an available movement network comprising portions of transportation schedules having open capacity, each portion of a transportation schedule having open capacity being a potential leg of a path from the origin location to the destination location. The open capacity is available via a direct, indirect, or movement added modification of the transportation schedule. The computer-readable program code portions further comprise an executable portion configured to determine one or more potential solutions for transporting the load from the origin location to the destination location by combining one or more legs to determine a path of open capacity movements from the origin location to at least part way to the destination location; and an executable portion configured to provide at least one of the one or more potential solutions for display via a user interface.

According to still another aspect of the present invention, a method for removing a schedule from a transportation plan is provided. In an example embodiment, the method comprises receiving information identifying a schedule to be removed, the schedule being one of a plurality of schedules comprising a transportation plan; identifying one or more loads assigned to the schedule; and for each load assigned to the schedule, identifying one or more potential replacement schedules for the leg associated with the schedule. Responsive to identifying the one or more potential replacement schedules for each load assigned to the schedule, it is determined whether the schedule can be removed from the transportation plan. Responsive to determining that the schedule can be removed from the transportation plan, information associated with at least one of the potential replacement schedules is provided for display via an interface.

According to another embodiment of the present invention, an apparatus is provided. In an example embodiment, the apparatus comprises at least one processor and at least one memory including program code. The at least one memory and the program code configured to, with the processor, cause the apparatus to at least receive information identifying a schedule to be removed, the schedule being one of a plurality of schedules comprising a transportation plan; identify one or more loads assigned to the schedule; and for each load assigned to the schedule, identify one or more potential replacement schedules for the leg associated with the schedule. Responsive to identifying the one or more potential replacement schedules for each load assigned to the schedule, the at least one memory and the program code configured to, with the processor, cause the apparatus to at least determine whether the schedule can be removed from the transportation plan. Responsive to determining that the schedule can be removed from the transportation plan, The at least one memory and the program code configured to, with the processor, cause the apparatus to at least provide information associated with at least one of the potential replacement schedules for display via an interface.

According to yet another aspect of the present invention, a computer program product is provided. In an example embodiment, the computer program product comprises at least one non-transitory computer-readable storage medium having computer-readable program code portions stored therein. The computer-readable program code portions comprise an executable portion configured to receive information identifying a schedule to be removed, the schedule being one of a plurality of schedules comprising a transportation plan; an executable portion configured to identify one or more loads assigned to the schedule; and an executable portion configured to for each load assigned to the schedule, identify one or more potential replacement schedules for the leg associated with the schedule. The computer-readable program code portions further comprise an executable portion configured to, responsive to identifying the one or more potential replacement schedules for each load assigned to the schedule, determine whether the schedule can be removed from the transportation plan. The computer-readable program code portions further comprise an executable portion configured to, responsive to determining that the schedule can be removed from the transportation plan, provide information associated with at least one of the potential replacement schedules for display via an interface.

According to still another aspect of the present invention, a method for identifying one or more schedules that can be removed from a transportation plan is provided. In an example embodiment, the method comprises receiving input identifying a set of schedules from which one or more schedules are to be removed. The method further comprises, for a particular schedule of the set of schedules, (i) identifying each load assigned to the particular schedule; (ii) determining whether at least one potential replacement schedule can be identified for each load assigned to the particular schedule; and (iii) determining whether at least one potential replacement schedule can be identified for at least one load assigned to the particular schedule. Responsive to determining that at least one potential replacement schedule cannot be identified for at least one load assigned to the particular schedule, the method further comprises indicating that the particular schedule cannot be removed. Responsive to determining that at least one potential replacement schedule can be identified for at least one load assigned to the particular schedule, the method further comprises indicating that the particular schedule can be removed. The method further comprises repeating steps (i), (ii), and (iii) for reach particular schedule of the set of schedules. The method further comprises providing information regarding at least one schedule that may be removed for display via an interface.

According to another aspect of the present invention, an apparatus is provided. In an example embodiment, the apparatus comprises at least one processor and at least one memory including program code. The at least one memory and the program code are configured to, with the processor, cause the apparatus to at least receive input identifying a set of schedules from which one or more schedules are to be removed. The at least one memory and the program code are further configured to, with the processor, cause the apparatus to, for a particular schedule of the set of schedules, (i) identify each load assigned to the particular schedule; (ii) determine whether at least one potential replacement schedule can be identified for each load assigned to the particular schedule; and (iii) determine whether at least one potential replacement schedule can be identified for at least one load assigned to the particular schedule. Responsive to determining that at least one potential replacement schedule cannot be identified for at least one load assigned to the particular schedule, the at least one memory and the program code are configured to, with the processor, cause the apparatus to at least indicate that the particular schedule cannot be removed. Responsive to determining that at least one potential replacement schedule can be identified for at least one load assigned to the particular schedule, the at least one memory and the program code are configured to, with the processor, cause the apparatus to at least indicate that the particular schedule can be removed. The at least one memory and the program code are further configured to, with the processor, cause the apparatus to at least repeat steps (i), (ii), and (iii) for each particular schedule of the set of schedules. The at least one memory and the program code are further configured to, with the processor, cause the apparatus to at least provide information regarding at least one schedule that may be removed for display via an interface.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 is an example view of a load insertion user interface, in accordance with an embodiment of the present invention;

Figure 7C:
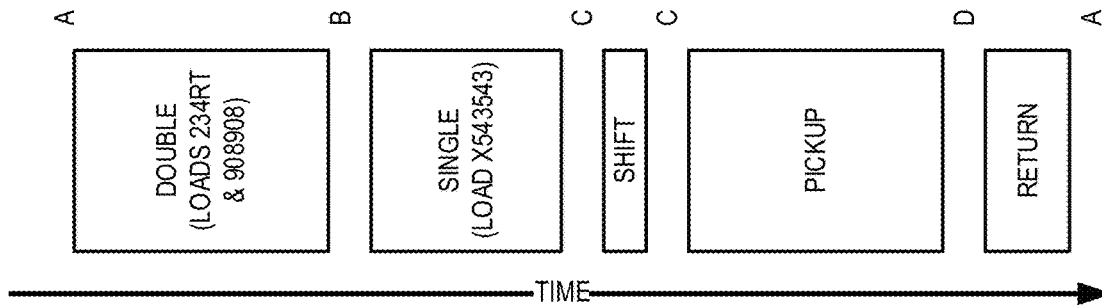
Figure 7B:
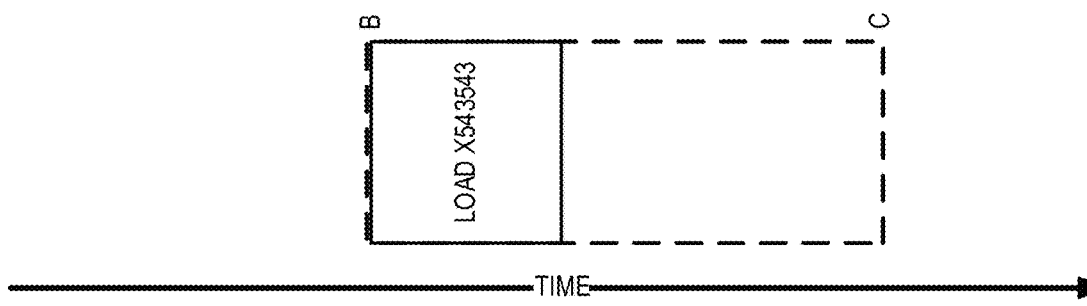
Figure 7A:
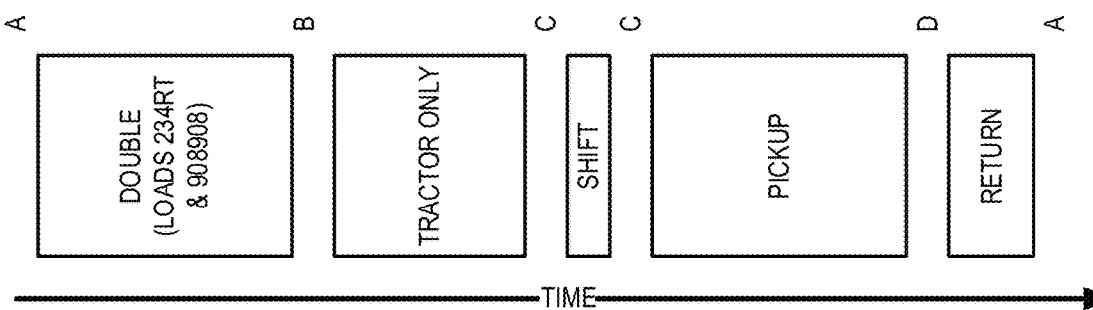
Figure 7F:
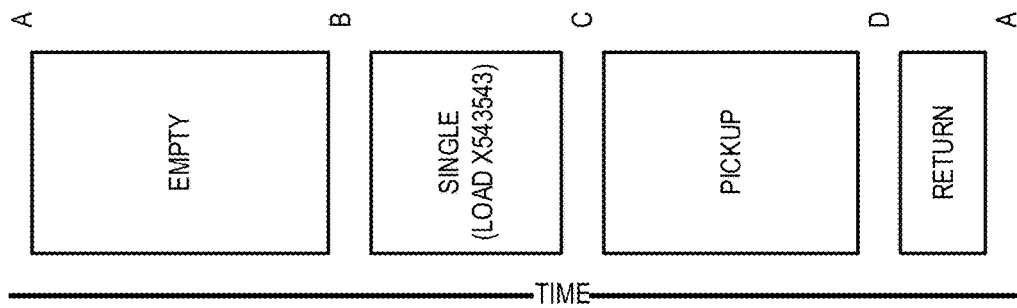
Figure 7E:
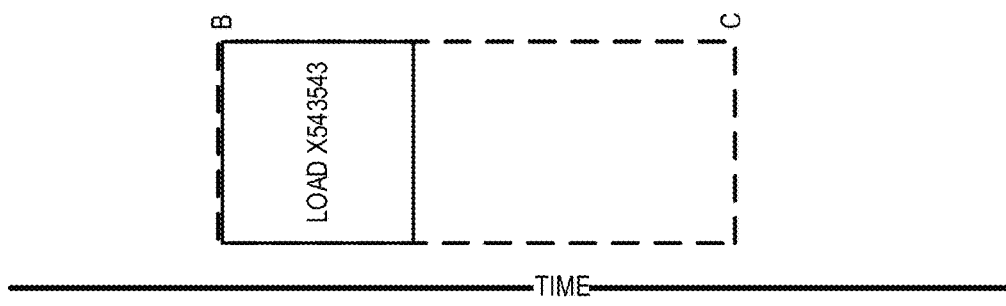
Figure 7D:
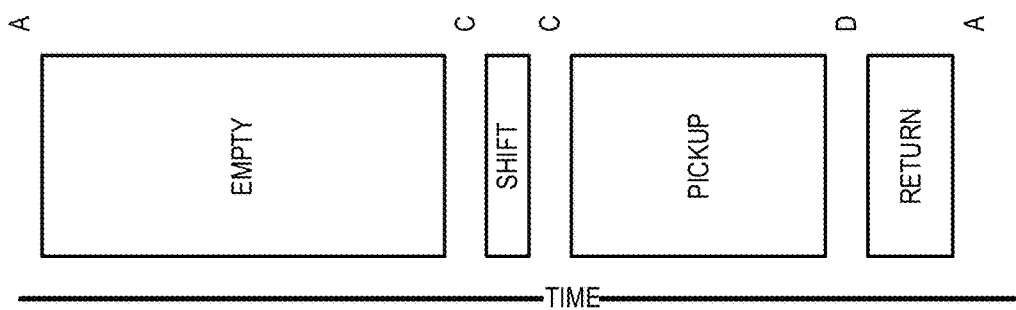
Figure 7I:
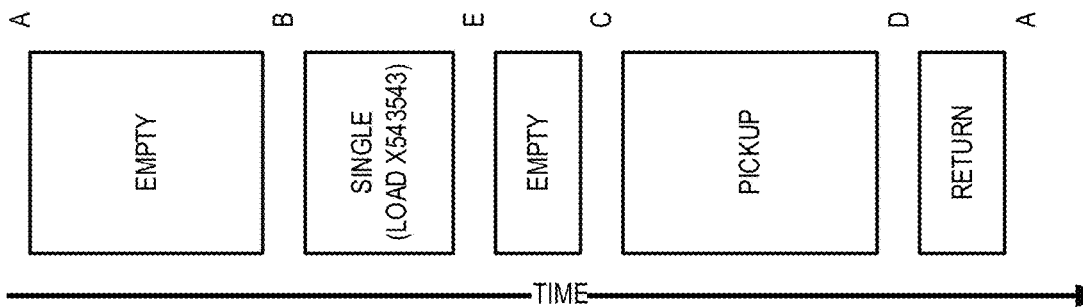
Figure 7H:
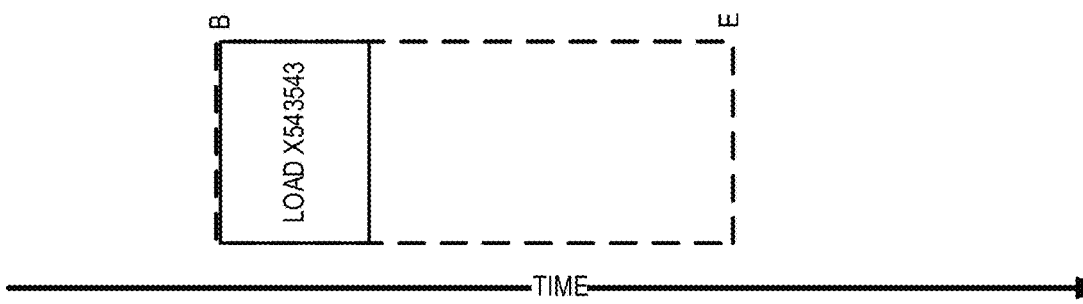
Figure 7G:
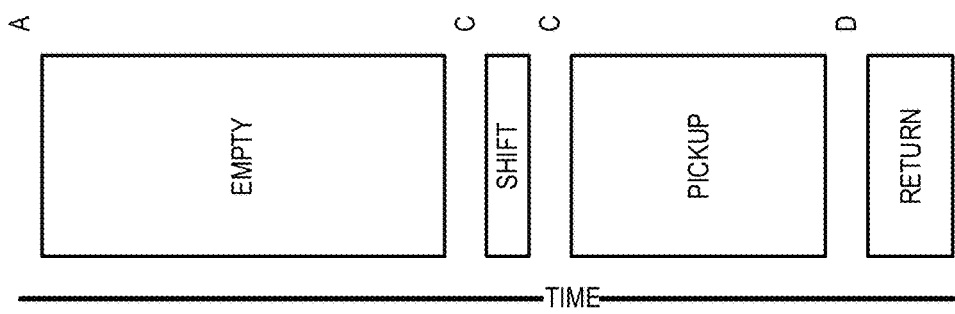
Figure 7L:
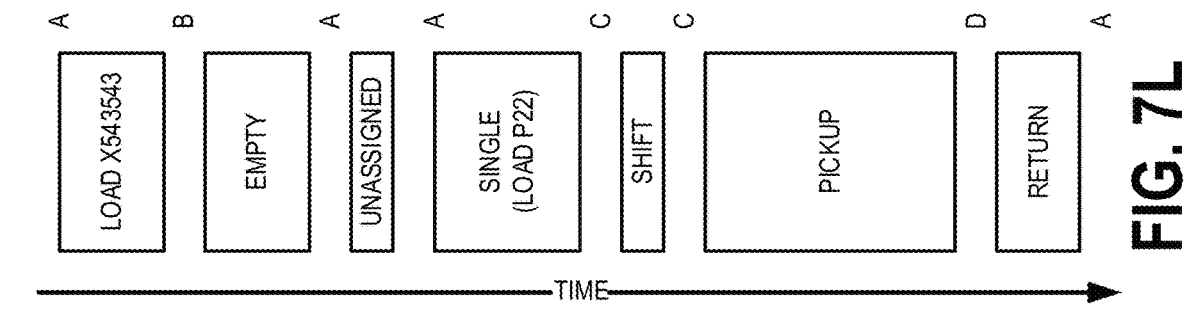
Figure 7K:
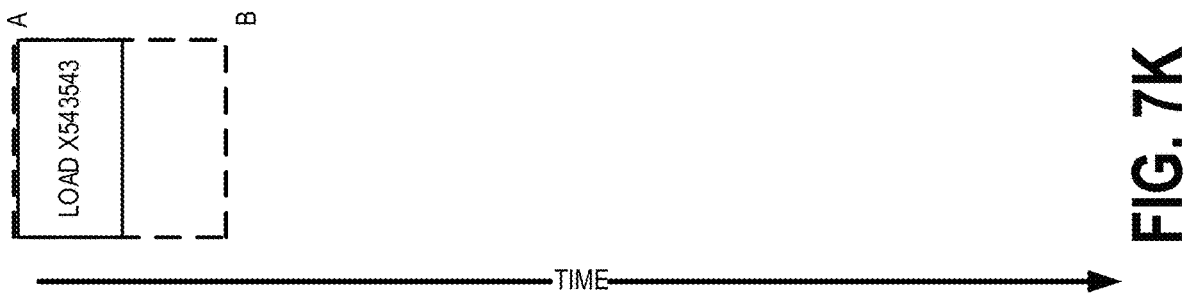
Figure 7J:
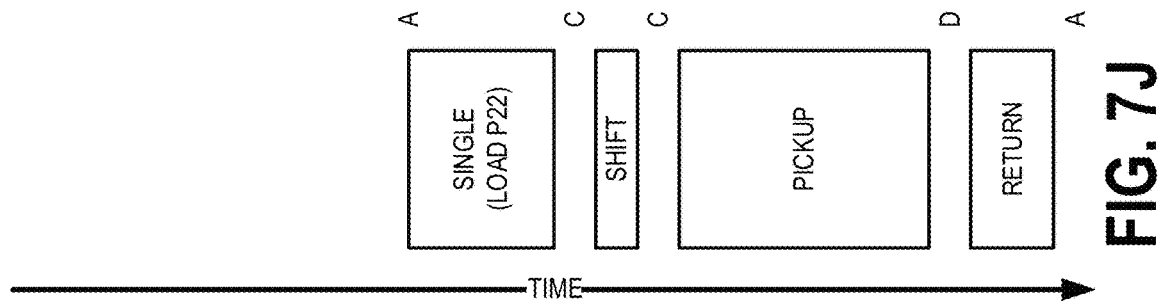
Figure 10:
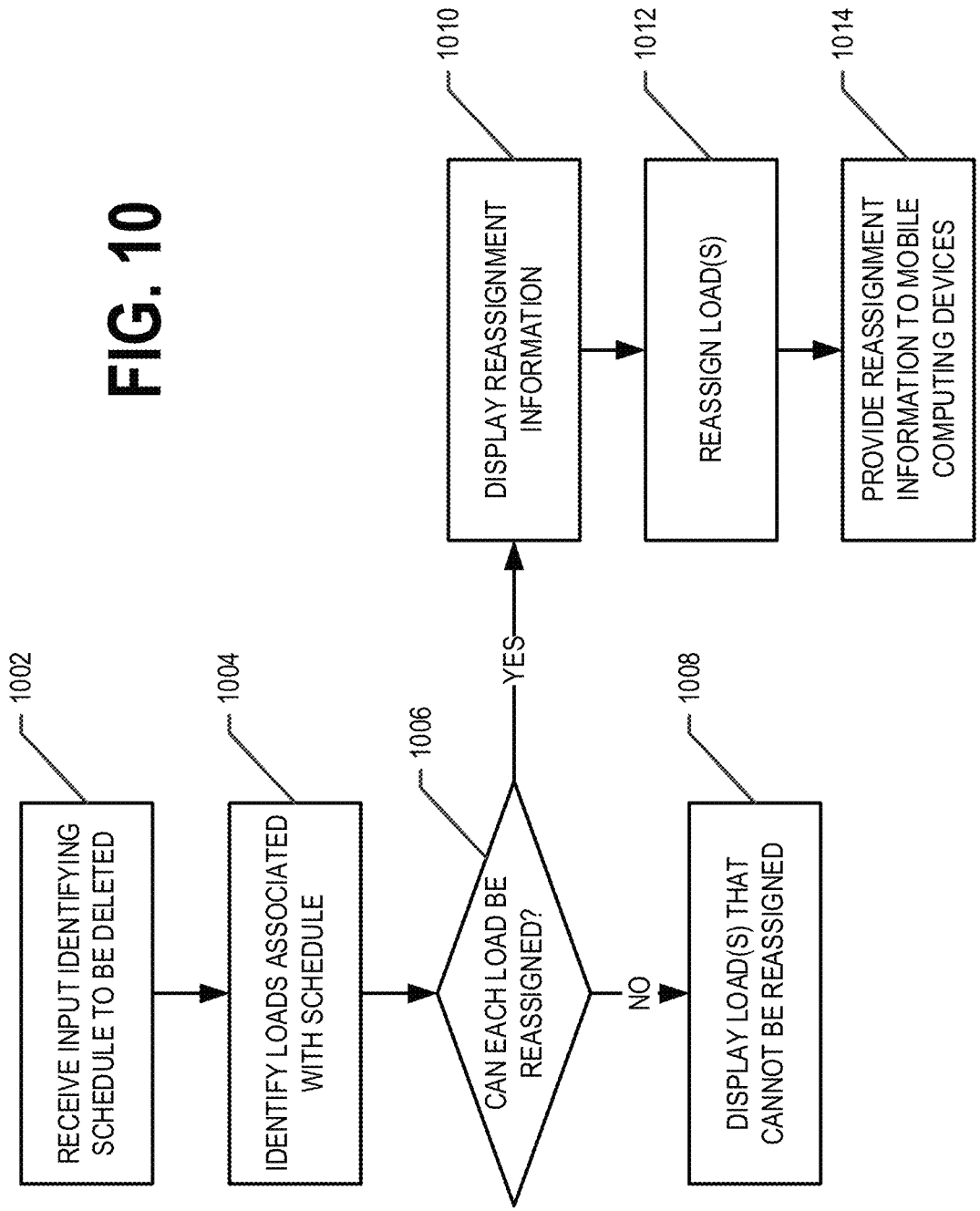
Figure 12:
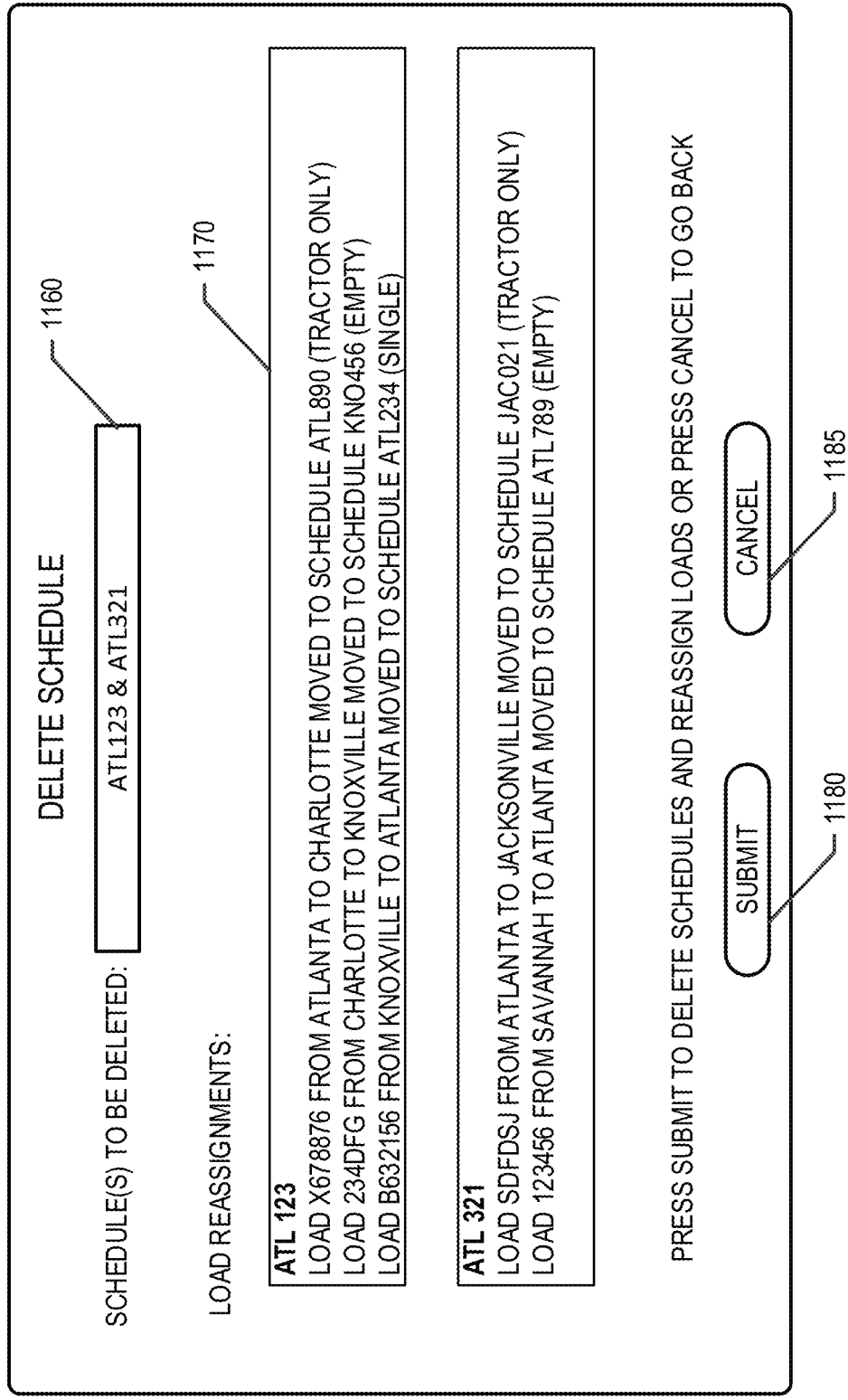
Figure 13:
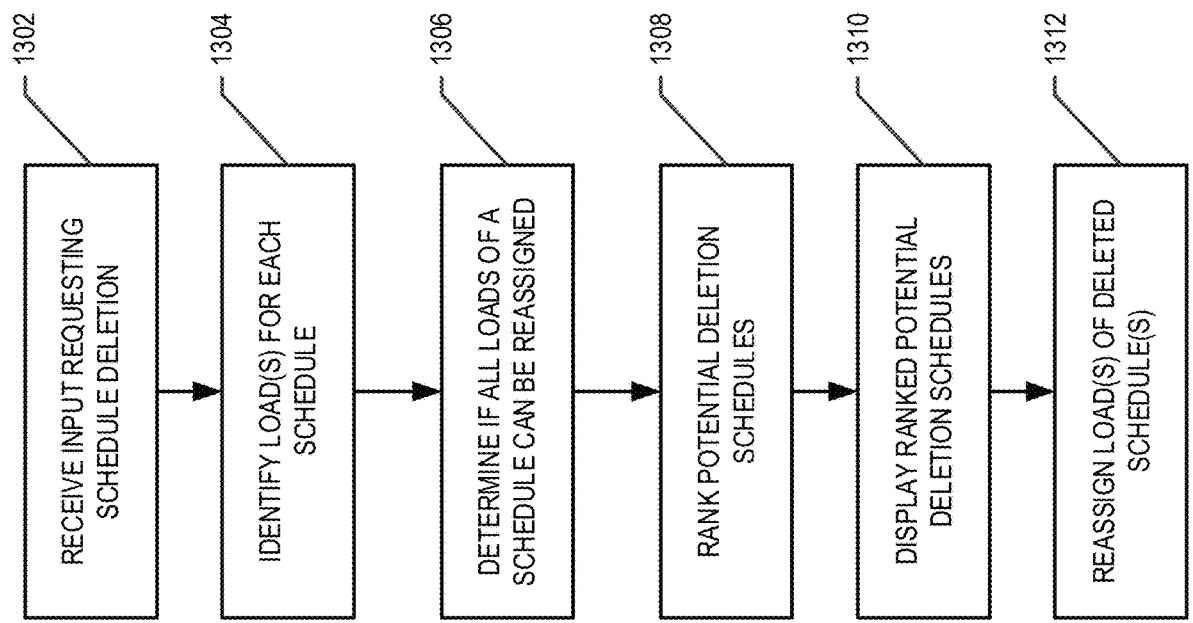

FIGS. 7A, 7B, and 7C show diagram representation of a schedule, a load time window for a particular leg/segment, and a directly modified schedule, respectively, in accordance with an embodiment of the present invention;

FIGS. 7D, 7E, and 7F show another diagram representation of another schedule, a load time window for a particular leg/segment, and an indirectly modified schedule, respectively, in accordance with an embodiment of the present invention;

FIGS. 7G, 7H, and 7I show still another diagram representation of still another schedule, a load time window for a particular leg/segment, and an indirectly modified schedule, respectively, in accordance with an embodiment of the present invention;

FIGS. 7J, 7K, and 7L show yet another diagram representation of yet another schedule, a load time window for a particular leg/segment, and a modified schedule that has had a movement added, respectively, in accordance with an embodiment of the present invention;

FIG. 8 is an example view of a load insertion user interface, in accordance with an embodiment of the present invention;

FIG. 9 is a flowchart showing some processes and procedures that may be completed to insert a load into a transportation plan in accordance with various embodiments of the present invention;

FIG. 10 is a flowchart showing some processes and procedures that may be completed to delete one or more schedules from a transportation plan;

FIG. 11 is an example view of a schedule deletion user interface, in accordance with an embodiment of the present invention;

FIG. 12 is an example view of a schedule deletion user interface, in accordance with an embodiment of the present invention; and FIG. 13 is a flowchart illustrating some processes and procedures that may be completed to identify one or more schedules from a transportation plan to be deleted, in accordance with various embodiments of the present invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. GENERAL OVERVIEW

Embodiments of the present invention are directed to inserting one or more loads into a transportation plan and/or deleting one or more schedules from a transportation plan. In particular, a transportation plan may describe how and when a plurality of loads are to be transported through a transportation network associated with one or more carriers. The transportation network may comprise a plurality of hubs operated by the carrier(s) or another entity. The transportation plan may comprise a plurality of schedules. Each schedule may represent the work to be completed by a driver or other associate of the carrier on a particular day. A load may be transported through the transportation network from an origin location to a destination location. The path the load travels through the transportation network may be broken up into legs/segments, with each leg/segment assigned to a different schedule. For example, the transportation of a load between an origin location and a destination location may comprise a first leg/segment from the origin location to an intermediate location and a second leg/segment from the intermediate location to the destination location. If a new and/or unassigned load is to be added to the transportation plan, the new and/or unassigned load will need to be added in a manner that meets the time commitments corresponding to that load and minimize the need to add additional schedules to the transportation plan.

To insert a load into the transportation plan, multiple potential paths for the load to be transported through the transportation network may be identified. The feasibility of transporting the load along each of the multiple potential paths is explored. In various embodiments, an available movement network is built/generated/determined (e.g. a network of already planned movements that have an open/available capacity for at least a portion of the schedule) and potential paths from the origin location to the destination location through the available movement network are investigated. The load may then be assigned to one or more schedules for at least partial transportation through the transportation network from the origin location to the destination location corresponding to the load.

To delete a schedule from the transportation plan, various options for reassigning the loads assigned to the schedule to be deleted may be identified. The feasibility of the identified options may be explored and the loads may be reassigned such that the schedule may be deleted. In some embodiments, it may be determined which schedule(s) of a set of schedules may be deleted.

III. EXEMPLARY SYSTEM ARCHITECTURE

Figure 1:
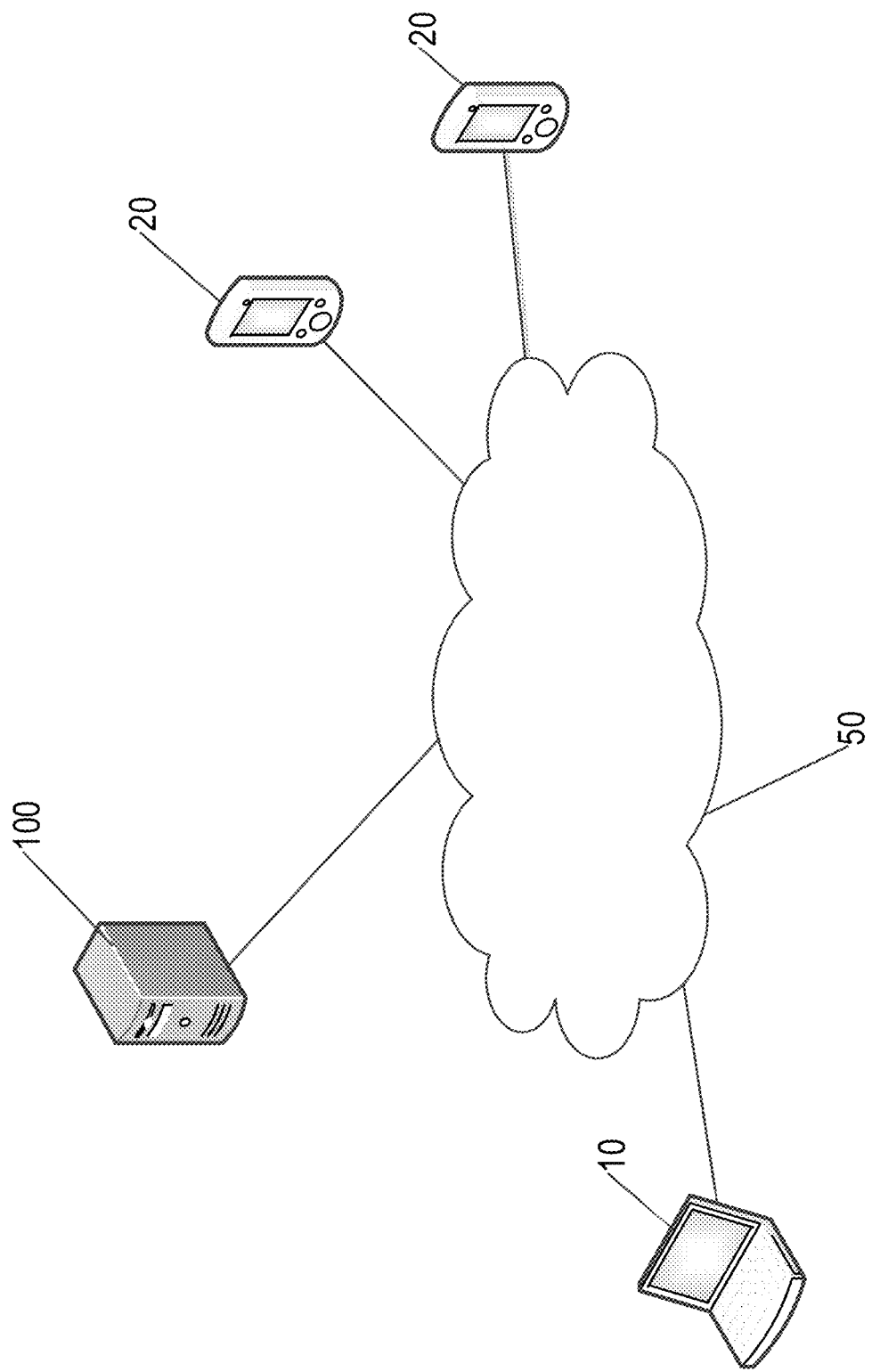
FIG. 1 is an overview of a system that can be used to practice embodiments of the present invention.

FIG. 1 provides an illustration of an exemplary architecture for an embodiment of the present invention. As shown in FIG. 1, this particular embodiment may include one or more planning systems 100, one or more networks 50, one or more user computing entities 10, and one or more mobile computing devices 20. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture. For example, in one embodiment, the planning system 100 and the user computing entity 10 may be integrated or the user computing entity 10 may be a thin client of the planning system 100.

1. Exemplary Planning Systems 100

A planning system 100 may be operated by and/or on behalf of a carrier. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowdsourcing services, retailers, and/or the like. In various embodiments, multiple planning systems 100 may be used to assist with the planning and/or carrying out of a transportation plan. For example, the planning system 100 may be configured to create, maintain, modify, and update a transportation plan and provide information regarding the transportation plan to drivers or other associates of the carrier(s) (e.g., via transmitting information regarding the transportation plan and/or portions thereof to mobile computing devices 20 associated with the driver(s) or other associate(s) or to one or more user computing entities 10).

Figure 2:
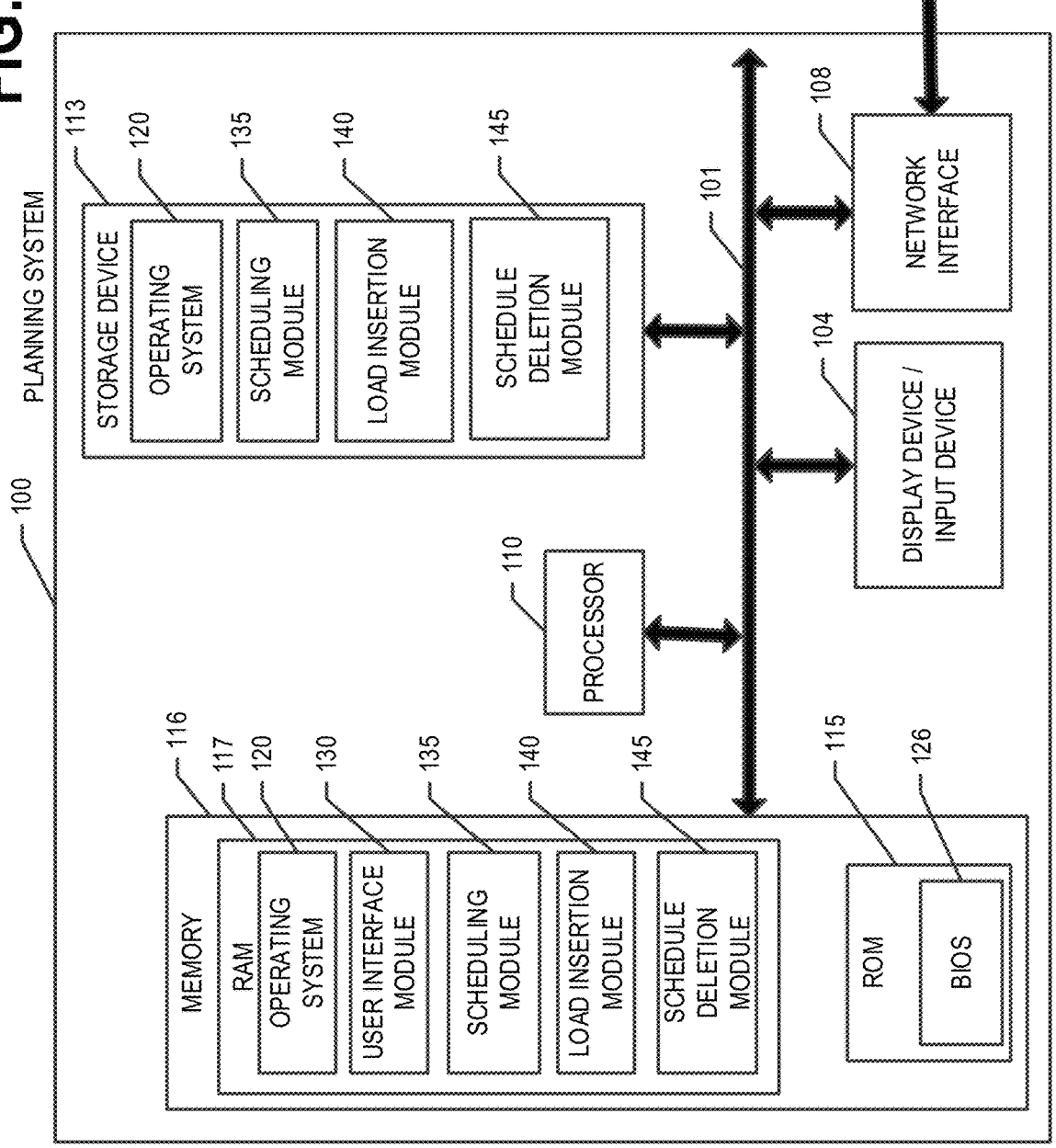
FIG. 2 is an exemplary schematic diagram of a planning system according to one embodiment of the present invention.

FIG. 2 shows a schematic diagram of an example planning system 100. In general, the term system may refer to, for example, one or more computers, computing devices, computing entities, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the planning system 100 may also include one or more communications interfaces for communicating with various computing entities, such as by communicating data, content, information, and/or similar terms used herein interchangeably that can be transmitted, received, operated on, processed, displayed, stored, and/or the like. For instance, the planning system 100 may communicate with one or more user computing entities 10, and/or one or more mobile computing devices 20.

In one embodiment, the planning system 100 may include or be in communication with one or more processing elements 110 (also referred to as processors, processing circuitry, and/or similar terms used herein interchangeably) that communicate with other elements within the planning system 100 via a bus 101, for example. As will be understood, the processing element 110 may be embodied in a number of different ways. For example, the processing element may be embodied as one or more complex programmable logic devices (CPLDs), microprocessors, multi-core processors, coprocessing entities, application-specific instruction-set processors (ASIPs), and/or controllers. Further, the processing element 110 may be embodied as one or more other processing devices or circuitry. The term circuitry may refer to an entirely hardware embodiment or a combination of hardware and computer program products. Thus, the processing element 110 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 110 may be configured for a particular use or configured to execute instructions stored in volatile or non-volatile media or otherwise accessible to the processing element. As such, whether configured by hardware or computer program products, or by a combination thereof, the processing element 110 may be capable of performing steps or operations according to embodiments of the present invention when configured accordingly.

In one embodiment, the planning system 100 may further include memory or be in communication with memory 116, which may comprise non-volatile media (also referred to as non-volatile storage, memory, memory storage, memory circuitry and/or similar terms used herein interchangeably). In one embodiment, the non-volatile storage or memory 116 may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. For example, the non-volatile storage or memory may store code including user interface module 130, scheduling module 135, load insertion module 140, and/or schedule deletion module 145. The term database, database instance, database management system, and/or similar terms used herein interchangeably may refer to a structured collection of records or data that is stored in a computer-readable storage medium, such as via a relational database, hierarchical database, and/or network database. For example, the non-volatile storage or memory may comprise a map data database, load information database, schedule database, and/or the like.

In one embodiment, the memory 116 may further comprise volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element. Thus, the databases, database instances, database management systems, data, applications, programs, program modules, scripts, source code, object code, byte code, compiled code, interpreted code, machine code, executable instructions, and/or the like may be used to control certain aspects of the operation of the planning system 100 with the assistance of the processing element 110 and operating system 120.

In various embodiments, memory 116 can be considered primary memory such as RAM memory or other forms which retain the contents only during operation, or it may be a non-volatile memory, such as ROM, EPROM, EEPROM, FLASH, or other types of memory that retain the memory contents. In some embodiments, the disk storage may communicate with the processor 110 using an I/O bus instead of a dedicated bus. The memory 116 could also be secondary memory, such as disk storage, that stores a relatively large amount of data. The secondary memory may be a floppy disk, hard disk, compact disk, DVD, or any other type of mass storage type known to those skilled in the computer arts. The memory 116 may also comprise any application program interface, system, libraries and any other data by the processor to carry out its functions. ROM 115 is used to store a basic input/output system 126 (BIOS), containing the basic routines that help to transfer information/data between components of the planning system 100, including the user interface module 130, scheduling module 135, load insertion module 140, schedule deletion module 145, and/or the operating system 120.

In addition, the planning system 100 includes at least one storage device 113, such as a hard disk drive, a floppy disk drive, a CD-ROM drive, or optical disk drive, for storing information/data on various computer-readable media, such as a hard disk, a removable magnetic disk, or a CD-ROM disk. As will be appreciated by one of ordinary skill in the art, each of these storage devices 113 is connected to the system bus 101 by an appropriate interface. It is important to note that the computer-readable media described above could be replaced by any other type of computer-readable media known in the art. Such media include, for example, memory sticks (e.g., USB memories), magnetic cassettes, flash memory cards, digital video disks, and Bernoulli cartridges.

A number of program modules may be stored by the various storage devices and within RAM 117. Such program modules include the operating system 120, the user interface module 130, the scheduling module 135, the load insertion module 140, and/or the schedule deletion module 145. Those skilled in the art will appreciate that other modules may be present in RAM 117 to effectuate the various embodiments of the present invention. Furthermore, the functions of the user interface module 130, scheduling module 135, load insertion module 140, and/or schedule deletion module 145 need not be modular.

Also located within the planning system 100 is a network interface 108, for interfacing and communicating with other elements of a computer network, such as by communicating data, content, information, and/or similar terms used herein interchangeably that can be transmitted, received, operated on, processed, displayed, stored, and/or the like. For instance, the planning system 100 may be in communication with one or more user computing entities 10, and/or one or more mobile computing devices 20. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the planning system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol.

Various information/data can be received by the planning system 100 via the network interface 108 and/or input/output device 104. This information/data may include information/data related to the product to be launched, information/data related to consumers and retailers to whom products are to be delivered, product launch security concerns, customs regulations, shipment status information/data (e.g., location (full address, GPS coordinates), containerization (carton, skid, pallet, ULD, truck, plane, building, package car), date/time stamp, any exception to planned flow, package level data, and/or the like) and/or the like. This input information/data may vary, however, depending on the configuration and informational requirements of the planning system 100.

As mentioned above, the planning system 100 also includes an input/output device 104 for receiving and displaying data. The planning system 100 may include or be in communication with one or more input elements, such as a keyboard input, a mouse input, a touch screen/display input, audio input, pointing device input, joystick input, keypad input, and/or the like, as indicated by input/output device 104. The planning system 100 may also include or be in communication with one or more output elements, as indicated by input/output device 104, such as audio output, video output, screen/display output, motion output, movement output, and/or the like.

In various embodiments, the planning system 100 may be configured to plan and/or coordinate a product launch. The planning system 100 may be further configured to access information/data related to an product being launched, consumers and retailers to whom products are to be delivered on the launch date, customs regulations that may be relevant to the product, warehousing and/or security concerns relevant to the product, and/or the like. For example, in various embodiments, the planning system 100 may be configured to coordinate the pre-positioning of product and retaining product at a carrier facility closer to the consignee (e.g., closer to a target market) reducing strain on the supply chain solution and transportation network and helping to enable delivery on a single day (e.g., the launch date). In various embodiments, the planning system 100 may be configured to receive input and/or information/data from or provide information/data to one or user computing entities 10 and/or one or more mobile computing devices 20. The planning system 100 may be configured to be in communication with one or more user computing entities 10, and/or one or more one or more mobile computing devices 20.

The planning system 100 may also comprise, be associated with, or be in communication with various other internal systems, such as systems for coordinating transportation resources, systems related to customs brokerage, security systems, systems for providing shipment visibility and/or tracking, and a variety of other systems and their corresponding components.

Those skilled in the art will recognize that many other alternatives and architectures are possible and can be used to practice various embodiments of the invention. The embodiment illustrated in FIG. 2 can be modified in different ways or incorporated within a network and be within the scope of the invention. For example, one or more components of the planning system 100 may be located remotely from other planning system 100 components, such as in a distributed system. Furthermore, one or more of the components may be combined and additional components performing functions described herein may be included or associated with the planning system 100. Thus, the planning system 100 can be adapted to accommodate a variety of needs and circumstances.

2. Exemplary Mobile Computing Device 20

Figure 3:
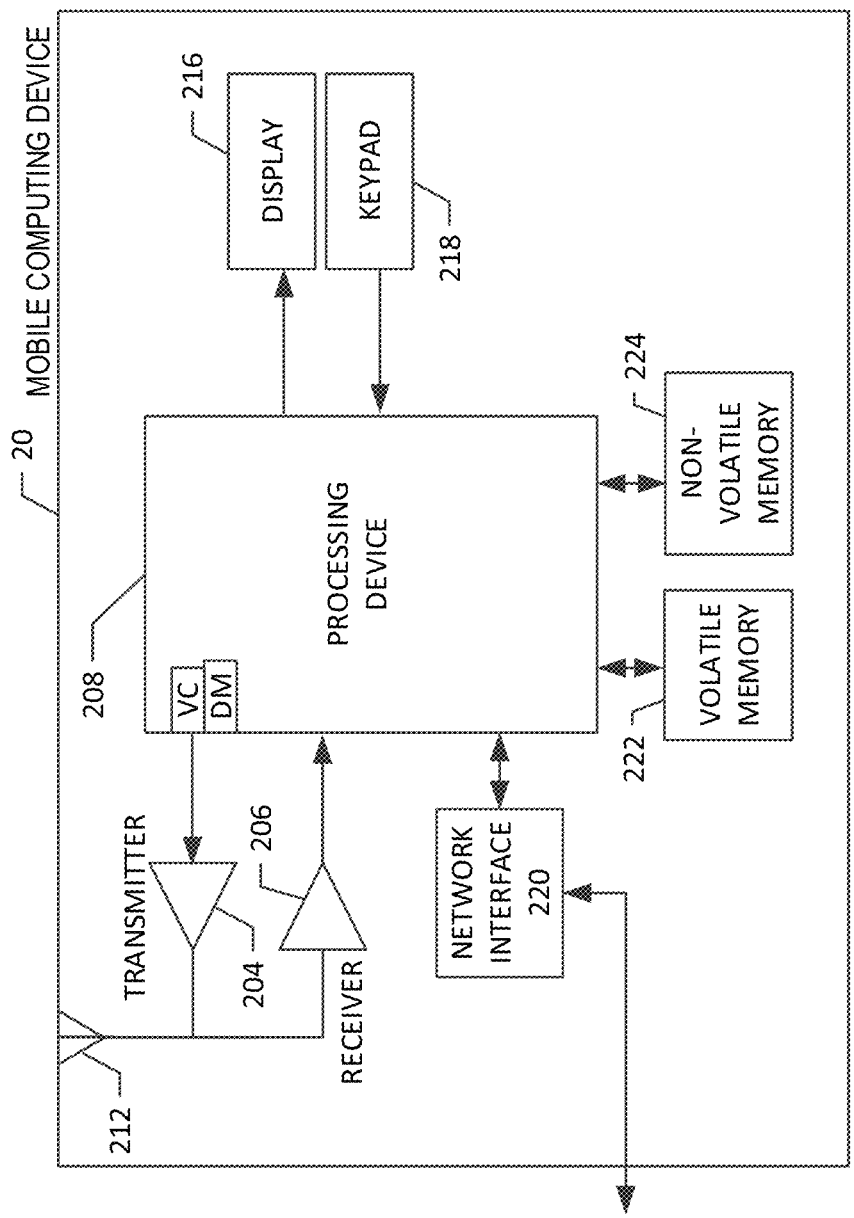
FIG. 3 is an exemplary schematic diagram of a mobile computing device according to one embodiment of the present invention.

A mobile computing device 20 may be associated with a particular schedule and/or a driver or other associate of a carrier. For example, a mobile computing device 20 may be located in or associated with a truck or tractor operated by and/or on behalf of a carrier. FIG. 3 provides an illustrative schematic representative of a mobile computing device 20 that can be used in conjunction with embodiments of the present invention. In general, the terms device, system, computing entity, entity, and/or similar words used herein interchangeably may refer to, for example, one or more computers, computing entities, desktops, mobile phones, smartphones, tablets, phablets, notebooks, laptops, distributed systems, gaming consoles (e.g., Xbox, Play Station, Wii), portable game consoles (e.g., Game Boy, Nintendo DS), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

As shown in FIG. 3, the mobile computing device 20 can include an antenna 212, a transmitter 204 (e.g., radio), a receiver 206 (e.g., radio), and a processing element 208 (e.g., CPLDs, microprocessors, multi-core processors, coprocessing entities, ASIPs, microcontrollers, and/or controllers) that provides signals to and receives signals from the transmitter 204 and receiver 206, respectively.

The signals provided to and received from the transmitter 204 and the receiver 206, respectively, may include signaling information/data in accordance with air interface standards of applicable wireless systems. In this regard, the mobile computing device 20 may be capable of operating with one or more air interface standards, communication protocols, modulation types, and access types. More particularly, the mobile computing device 20 may operate in accordance with any of a number of wireless communication standards and protocols, such as those described above with regard to the planning system 100. In a particular embodiment, the mobile computing device 20 may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, WiMAX, UWB, IR, NFC, Bluetooth, USB, and/or the like. Similarly, the mobile computing device 20 may operate in accordance with multiple wired communication standards and protocols, such as those described above with regard to the planning system 100 via a network interface 220.

Via these communication standards and protocols, the mobile computing device 20 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile computing device 20 can also download changes, add-ons, and updates, for instance, to its firmware, software (e.g., including executable instructions, applications, program modules), and operating system.

According to one embodiment, the mobile computing device 20 may include a location determining aspects, device, module, functionality, and/or similar words used herein interchangeably. For example, the mobile computing device 20 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, global positioning systems (GPS), and/or the like. Alternatively, the location information/data can be determined by triangulating the mobile computing device's 20 position in connection with a variety of other systems, including cellular towers, Wi-Fi access points, accelerometers, gyroscopes, and/or the like. Similarly, the mobile computing device 20 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The mobile computing device 20 may also comprise a user interface (that can include a display 216 coupled to a processing element 208) and/or a user input interface (coupled to a processing element 208). For example, the user interface may be a mobile application, a user application, browser, user interface, and/or similar words used herein interchangeably executing on and/or accessible via the mobile computing device 20 to interact with and/or cause display of information/data from the planning system 100, as described herein. The user input interface can comprise any of a number of devices allowing the mobile computing device 20 to receive data, such as a keypad 218 (hard or soft), a touch display, voice/speech or motion interfaces, or other input device. In embodiments including a keypad 218, the keypad 218 can include (or cause display of) the conventional numeric (0-9) and related keys (#, *), and other keys used for operating the mobile computing device 20 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile computing device 20 can also include volatile storage or memory 222 and/or non-volatile storage or memory 224, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile computing device 20. As indicated, this may include a user application that is resident on the entity or accessible through a browser or other user interface for communicating with the planning system 100 and/or various other computing entities. For example, a user may use the mobile computing device 20 to access a user interface provided by a planning system 100 or other carrier system configured to provide schedule and/or load information/data.

In another embodiment, the mobile computing device 20 may include one or more components or functionality that are the same or similar to those of the planning system 100, as described in greater detail above. As will be recognized, these architectures and descriptions are provided for exemplary purposes only and are not limiting to the various embodiments.

3. User Computing Entity 10

In one embodiment, a user (e.g., an employee or associate of a carrier) may operate a user computing entity 10. For example, an employee or associate of a carrier may use a user computing entity 10 to input information/data regarding one or more loads to be inserted into a transportation plan or one or more schedules deleted from a transportation plan, receive and/or view information/data associated with a transportation plan, schedule, or load, and/or perform other tasks associated with transporting loads through the transportation network. A user computing entity 20 may include one or more components that are functionally similar to those of the planning system 100 and/or the mobile computing device 20. For example, in one embodiment, each user computing entity 10 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, a user computing entity 10 may communicate or interact with any number of planning systems 100, and/or mobile computing devices 20 via their respective communication interfaces information/data. In one embodiment, the user computing entity 10 is a thin client of the planning system 100 or other server system operated by and/or on behalf of the carrier. As will be recognized, these architectures and descriptions are provided for exemplary purposes only and are not limiting to the various embodiments.

III. EXEMPLARY SYSTEM OPERATION

As noted above, embodiments of the present invention provide tools for updating a transportation plan. For example, embodiments of the present invention may provide a tool for inserting a load into a transportation plan, deleting a schedule from a transportation plan, identifying schedules that may be deleted from a transportation plan without affecting the carrier's ability to transport a set of loads through a transportation network, and/or the like.

In various scenarios, a transportation plan may need to be updated in real time, near real time, and/or with a short lead time. For example, information regarding a rush load may be received only a short time before the load may need to be picked up and efficiently transported through the transportation network to ensure the load is delivered on time. Thus, the transportation plan may need to be updated quickly. Additionally, as the transportation network may be quite vast and the number of schedules comprising the transportation plan may be quite numerous, it may be difficult to update the transportation plan quickly while ensuring that the load is efficiently routed (e.g., new schedules are not unnecessarily added, the load not transported over a path through the transportation network that is excessively long, and/or the like). Thus, computer-implementations of efficient methods may be required to complete the large number of procedures, processes, calculations, determinations, and/or the like needed to efficiently update a transportation plan within the available time frame.

1. Inserting a Load into a Transportation Plan

Figure 4:
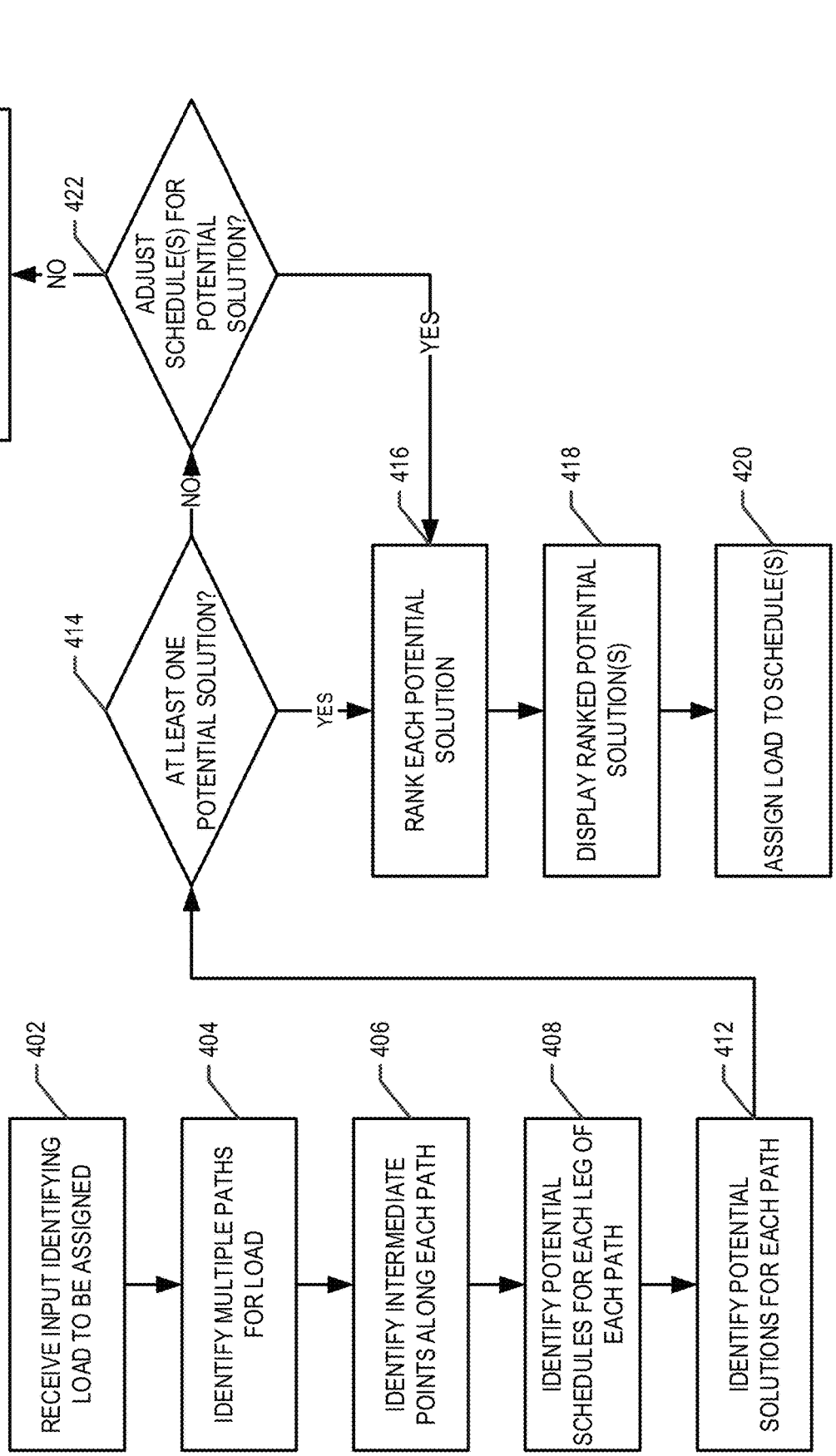
FIG. 4 is a flowchart illustrating some processes and procedures that may be completed to insert a load into a transportation plan in accordance with various embodiments of the present invention.

FIG. 4 provides a flowchart of various processes and procedures related to inserting a load into a transportation plan, in accordance with various embodiments of the present invention. Starting at step 402, information/data identifying a load to be inserted into the transportation plan is received. For example, the planning system 100 may receive information/data identifying a new/unassigned load to be inserted into the transportation plan or a previously assigned load that is to be reassigned. For example, a load insertion request may be received that identifies the load to be inserted into the transportation plan. In some embodiments, the information/data identifying the load to be inserted is provided by an employee or other associate of the carrier (e.g., a shipper, a receiver, a local/regional carrier, and/or the like) via a load insertion request form provided through a user interface (e.g., via the user computing entity 10).

FIG. 5 illustrates an example load insertion request interface 500. The illustrated load insertion request interface 500 comprises a load identifier form field 502, an origin location form field 504, a leave/departure time form field 506, a destination location form field 508, an arrive/arrival time form field 510, a load size selector 512, a load weight form field 514, a special handling instructions form field 516, and a submit button 518.

In various embodiments, the load identifier form field 502 may be configured to receive input indicating a load identifier (e.g., an alphanumeric or other identifier). In various embodiments, each load may be associated with a load identifier. For example, the load identifier may be stored in association with electronic load information/data corresponding to the load, noted on any paperwork corresponding to the load, and/or encoded within a machine or human-readable sticker or label (text, barcodes, tags, character strings, Aztec Codes, MaxiCodes, Data Matrices, Quick Response (QR) Codes, electronic representations, and/or the like), radio frequency identification (RFID) tag, and/or the like attached to the physical load, and/or the like. In various embodiments, a user (e.g., operating a user computing entity 10) may type or otherwise input the load identifier corresponding to the load to be inserted into the transportation plan into the load identifier form field 502. In some embodiments, the user may (e.g., operating a user computing entity 10) be able to select the load identifier corresponding to the load to be inserted into the transportation plan from a scratch pad. In various embodiments, the scratch pad may be configured to store/compile information/data corresponding to one or more loads for which corresponding electronic load information/data is available to the planning system 100, or other carrier system, but which are not currently incorporated into the transportation plan (e.g., the loads are not assigned to at least one schedule). In another embodiment, the user may (e.g., operating a user computing entity 10) scan the encoded load identifier attached to the physical load using an optical scanner, infrared scanner, RFID reader, and/or the like to provide input indicating the load identifier.

In various embodiments, if the provided load identifier is associated with electronic load information/data already stored by/available to the planning system 100 or other carrier system, the remaining form fields (or at least one of the remaining form fields) of the load insertion request interface 500 may be automatically filled. For example, the planning system 100 may access the load information/data corresponding to the load identified by the user provided/selected load identifier and may automatically fill at least one form field of the load insertion request interface 500. In other embodiments, or if electronic load information/data is not stored/available to the planning system 100, the user may (e.g., operating a user computing entity 10) input information/data into one or more form fields in addition to the load identifier form field 502.

The origin location form field 504 is configured for receiving input indicating and/or otherwise identifying the origin location of a load. In various embodiments, the origin location may be the location of the shipper or the hub or other carrier operations center at which the load enters the transportation network. For example, a shipper located in Marietta, Ga. may ship a load. The carrier may pick up the load and bring the load to the Atlanta hub. In various embodiments, the origin location of the load may be the Atlanta hub. In another embodiment, the origin location may be Marietta, Ga. The leave/departure time form field 506 is configured to receive input indicating and/or identifying the earliest time (e.g., date and time) at which the load is available to leave the origin location. For example, the load may be available to be picked up from the shipper in Marietta at 2:30 pm on Nov. 1, 2015. The load may be transported to the Atlanta hub, be processed, and be available to leave the Atlanta hub or other carrier operations center at 7:00 pm on Nov. 1, 2015. In various embodiments, the origin location is the hub or other carrier operations center at which the load enters the transportation network and, in such embodiments, for this example, the leave/departure time is Nov. 1, 2015 at 7:00 pm. In one embodiment, the shipper's location is the origin location, and, in this embodiment, for this example, the leave/departure time is Nov. 1, 2015 at 2:30 pm. In various embodiments, if the origin location and/or leave/departure time are stored and/or available to the planning system 100 and/or other carrier system, the origin location form field 502 and/or the leave/departure time form field 504 may be automatically filled by the user computing entity 10 upon receiving the load identifier via load identifier form field 502 or the like.

The destination location form field 508 is configured for receiving input indicating and/or otherwise identifying the destination location of a load. In various embodiments, the destination location may be the location of the receiver of the load or the hub or other carrier operations center from which the load will be delivered to the receiver (e.g., the hub or other carrier operations center from which the load will leave the transportation network). For example, the receiver may be located in Springdale, Ohio and the load may be delivered to the receiver from the Cincinnati hub. Thus, in various embodiments, the destination location is the Cincinnati hub. In another embodiment, the destination location is Springdale, Ohio. In various embodiments, the arrive/arrival time form field 510 is configured to receive input indicating and/or identifying the latest time (e.g., date and time) at which the load should be present at the destination location. For example, if the load is to be delivered to the receiver in Springdale, Ohio no later than 4 pm on Nov. 3, 2015, the load may need to arrive at the Cincinnati hub no later than 1 pm on Nov. 3, 2015 so that the load may be processed and delivered to the receiver in accordance with the delivery time. For example, if the hub or other carrier operations center from which the load leaves the transportation network is considered the destination location, the load should arrive at the Cincinnati hub no later than 1 pm on Nov. 3, 2015 (e.g., the arrival time is Nov. 3, 2015 at 1 pm). In an embodiment in which the destination location is the receiver's location, the arrival time is Nov. 3, 2015 at 4 pm. In various embodiments, if the destination location and/or arrive/arrival time are stored and/or available to the planning system 100 and/or other carrier system, the destination location form field 508 and/or the arrive/arrival time form field 510 may be automatically filled by the user computing entity 10 upon receiving the load identifier via load identifier form field 502 or the like.

The load insertion request interface 500 may be further configured to receive information regarding the size and/or weight of the load. For example, the load size selector 512 is configured to receive input indicating and/or otherwise identifying the size of the load. For example, the load may comprise a single pallet, a plurality of pallets, be a less-than-truckload (LTL) load that takes up less than half of a trailer, an LTL that takes up more than half a trailer, a small trailer load, a large trailer load, and/or the like. In various embodiments, the options provided via the load size selector 512 may vary depending on what information/data the carrier perceives as being most effective. In some embodiments, the user may (e.g., operating a user computing entity 10) provide input indicating the size of the load rather than selecting a pre-defined option (e.g., the load size selector 512 may be replaced with a load size form field or the like). In various embodiments, the user may (e.g., operating a user computing entity 10) provide input indicating a weight of the load via load weight form field 514. The weight of the load may be important in determining if the load may be pulled as part of a double (e.g., where one tractor pulls two trailers), to determine if two LTL loads may be transported in one trailer, or if a particular type of tractor is needed to pull the load (e.g., a tractor with a higher weight limit, or the like). In various embodiments, if the load size, a load size indicator, and/or the weight of the load is stored and/or available to the planning system 100 and/or other carrier system, a load size indicator provided by the load size selector 512 may be automatically selected and/or the load weight form field 514 may be automatically filled by the user computing entity 10 upon receiving the load identifier via load identifier form field 502 or the like.

In various embodiments, the user may (e.g., operating a user computing entity 10) provide input indicating special handling instructions or any other additional information/data that should be considered when transporting the load through the transportation network by providing input at special handling instructions form field 516. For example, if the load comprises model rocket engines, it may be important to route the load along a route that does not include any tunnels that ban explosives from passing through. In another example, if the load requires an extra wide trailer or is an extra tall load, care will need to be taken to route the load along a path that can accommodate the requirements of the load. In other examples, the special handling instructions may indicate that the load should be cooled or heated, contains hazardous waste, and/or is due other special considerations. In various embodiments, if any special handling instructions associated with the load are stored and/or available to the planning system 100 and/or other carrier system, the special handling instructions form field 516 may be automatically filled by the user computing entity 10 upon receiving the load identifier via load identifier form field 502 or the like.

In various embodiments, after the user (e.g., operating a user computing entity 10) provides input into at least one form field and/or selector, the user may (e.g., operating a user computing entity 10) submit the load insertion request to the planning system 100 by selecting/pressing/clicking the submit button 518. For example, the user may (e.g., operating a user computing entity 10) enter a load identifier configured to identify the load to be inserted into the transportation network and stored electronic load information/data may be used to automatically fill the remainder of the load insertion request. The user may (e.g., operating a user computing entity 10) then review the load insertion request for accuracy and select/press/click the submit button 518 to submit the load insertion request. In another embodiment, the user may (e.g., operating a user computing entity 10) provide input indicating the load identifier and other load information/data via the load insertion request interface 500 and select/submit/click the submit button 518 to submit the load insertion request. In yet another embodiment, the user may (e.g., operating a user computing entity 10) provide load information/data via one or more form fields (e.g., 504, 506, 508, 510, 514, 516) and/or one or more information/data selectors (e.g., 512) but not provide input indicating a load identifier (e.g., the user may (e.g., operating a user computing entity 10) leave the load identifier form field 502 empty). In such an embodiment, the user computing entity 10 and/or planning system 100 may generate a load identifier and associate the generated load identifier to the provided load information/data upon the load insertion request being submitted via submit button 518. In some such embodiments, the planning system 100 may check the provided information/data against stored electronic load information/data to determine if the load information/data provided via the load insertion request corresponds to a new load before generating a load identifier for identifying the corresponding load.

As should be understood, a load insertion request may be submitted or otherwise initiated through a variety of methods and techniques. The illustrated load insertion request interface 500 is provided as an example user interface that may be used to submit and/or initiate a load insertion request.

Returning to FIG. 4, at step 404, multiple paths for transporting the load through the transportation network from the origin location to the destination location are identified. For example, the planning system 100 may identify multiple paths for transporting a load from the origin location associated with the corresponding load data/information to the destination location associated with the corresponding load data/information. For example, in various embodiments, a space available network may be built based on movement of existing schedules having open capacities. In various embodiments, one or more schedules may be modified to make use of the open capacities available within the schedule and/or to add movements to the schedule. Of the multiple paths identified, a number of paths greater than a minimum number of paths and/or less than a maximum number of paths are found. In various embodiments, the paths found are within a configurable threshold distance of the shortest path. For example, only paths no longer than 200, 100, or 50 miles longer than the shortest path are considered. In another example, only paths that are less than 20%, 15%, 10%, or 5% longer than the shortest path are considered. At step 406, intermediate points along each path are identified. For example, the planning system 100 may identify one or more intermediate points along each path. For example, the intermediate points may be a hub or other carrier operations center, a truck stop, or any other predetermined location at which the load (e.g., a trailer containing the load) may be dropped off by one driver after completion of one leg/segment and picked up by another driver for another leg/segment.

Figure 6:
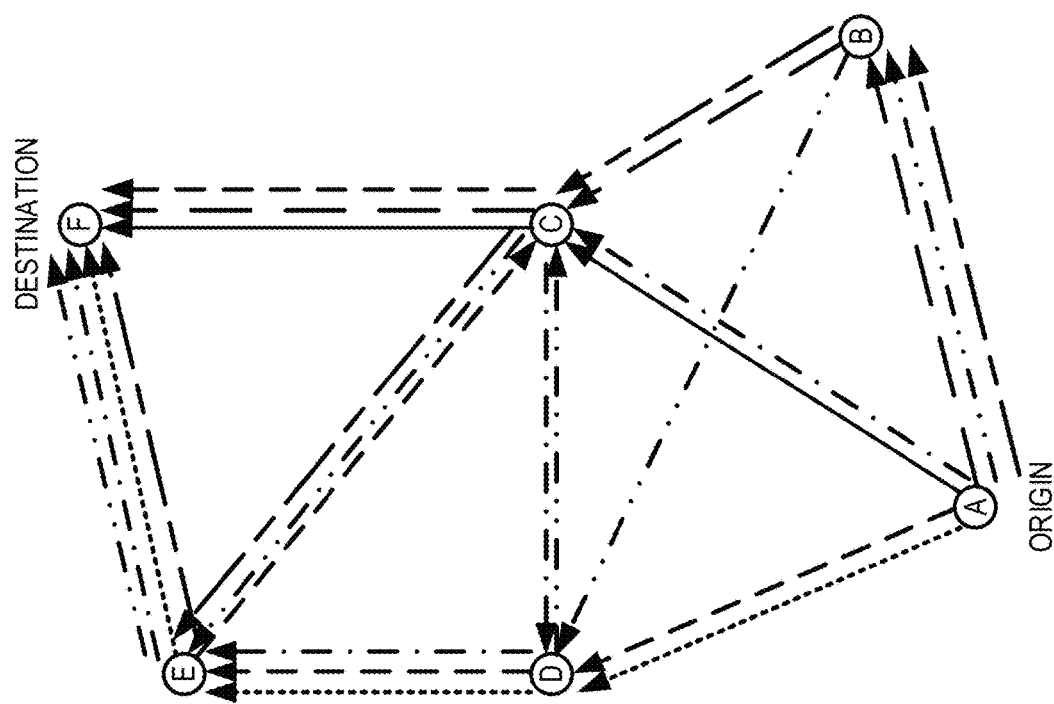
FIG. 6 is a diagram illustrating example multiple paths that may be taken from a origin location to a destination location, in accordance with an embodiment of the present invention.

FIG. 6 illustrates seven example paths from location A to location F via at least one of locations B, C, D, or E. As shown in FIG. 6, the number of legs/segments of one path may be different from another path. Or, in other words, some paths may include more intermediate locations and legs/segments than other paths.

Returning to FIG. 4, at step 408, potential schedules are identified for each leg/segment of the path. For example, the planning system 100 may identify one or more potential schedules for each leg/segment of the path. An example schedule may have an open/available capacity on a movement along a leg/segment of a proposed path that at least approximately matches a time window associated with the leg/segment of the path.

FIG. 7A illustrates a schedule of a transportation plan. In the example schedule, a driver will start the schedule by driving a double (e.g., transporting loads 234RT and 908908) from location A to location B. Next, the driver is scheduled to transport an empty trailer form location B to location C and shift one or more trailers at location C (e.g., reposition one or more trailers at location C to be loaded, unloaded, or staged for departure). The driver may depart location C, pick up a load from a shipper, and take the load to location D. The driver may then return to the driver's home hub, location A, to complete the schedule. For example, in various embodiments a schedule may be associated with a hub or other carrier operations center (e.g., a home hub) where the schedule begins and ends. In some embodiments, the schedule may have a maximum time length (e.g., 11 hours total, 11 hours of driving, and/or the like). For example, a schedule may only comprise 11 hours of driving within a 24 hour period or within a day. Thus, the schedule is designed to start at a home hub associated with the schedule and end at the home hub while taking at most the maximum time length worth of time to complete the schedule. Thus, in various embodiments, each leg/segment of a path must take at most half of the maximum time length to complete. In an example embodiment, a schedule may represent a team of drivers. For example, one driver may be off duty and in the sleeper portion of a tractor while the other driver of the team is driving. The two drivers may alternate between driving and being off duty such that they can provide continuous movement subject to Department of Transportation regulations. For a schedule representing a team of drivers, the schedule may not have a maximum time length or may have a maximum time length that is greater than 11 hours.

FIG. 7B illustrates an example time window for Load X543543 for a leg/segment between location B and location C. The schedule illustrated in FIG. 7A has an open/available capacity between locations B and C at a time similar to that of the time window for Load X543543. In various embodiments, the illustrated schedule is not considered a potential schedule transporting Load X543543 from location B to location C because the open/available capacity of the schedule between locations B and C does not fall within the time window for the load. In some embodiments, the planning system 100 may consider if the illustrated schedule may be modified such that the open/available capacity of the schedule falls within the time window for the load. For example, the illustrated schedule shows that the driver is to depart location B half an hour before Load X543543 is ready to leave location B. However, if the other portions of the schedule are not negatively affected, the entire schedule may be shifted to 30 minutes later. For example, the shift may start half an hour later and end half an hour later or the like. In another example, the schedule may start 30 minutes later, the shift portion of the schedule may be assigned to another schedule, and the modified schedule may end at the same time as the unmodified schedule. As should be understood, in some embodiments, schedules may be modified, especially if the other portions of the schedule are not negatively affected, to accommodate the new load being inserted into the transportation plan. For example, FIG. 7C shows a modified version of the schedule illustrated in FIG. 7A that has been modified to accommodate transporting Load X543543 between location B and location C in accordance with the time window of Load X543543. Thus, in various embodiments, a schedule may be modified to directly add a load. For example, the schedule may be modified to start earlier or later, the non-productive time in a schedule (shift time or other unassigned time) may be reduced, increased, or moved from one part of a schedule to a different part of the schedule (or a combination thereof) to align the beginning of a movement to a load time window. For example, a load may be directly inserted into a planned movement and/or a time-shifted planned movement.

FIGS. 7D, 7E, and 7F show another schedule, load time window for a particular leg, and a modified schedule, respectively for an example of an indirect modification of a schedule, in accordance with various embodiments of the invention. The example schedule shown in FIG. 7D comprises an empty leg from location A to location C, shift work at location C, a pick-up of a load while traveling between location C and location D, and a return movement to location A. FIG. 7E shows a load that needs to be transported from location B to location C during a time window that overlaps with the empty movement from location A to location C in the schedule illustrated in FIG. 7D. Thus, the schedule may be modified as shown in FIG. 7F. For example, the modified schedule may include an empty leg from location A to location B, the driver may then pick up the load from location B and transport the load to location C. The shift work at location C may be moved to another schedule such that the pick up between hubs C and D occurs within an appropriate time frame. In various embodiments, such a modification to a schedule may only be made if the modification adds no more than a threshold number of miles to the schedule (e.g., 200 miles) or a threshold amount of time to the schedule (e.g., 5 hours). For example, the planning system 100 may verify that any modifications to a schedule do not increase the miles traveled over the course of a schedule or the time driving during a schedule greater than a threshold increase in distance or time or above a total threshold distance or time. As should be understood, the schedule shown in FIG. 7D could be similarly modified to transport a load from location A to location B and then complete an empty leg from location B to location C. In another similar example, the schedule shown in FIG. 7G could be modified to transport the load having load window as shown in FIG. 7H. FIG. 7I illustrates a modified schedule in which an empty movement is made from location A to location B, the load is transported from location B to location E, an empty movement is completed from location E to location C. Thus, in various embodiments, a schedule may be indirectly modified to insert the transportation of a new or unassigned load into the schedule. For example, a schedule already having a planned available capacity may be modified to leverage at least a portion of the planned empty or tractor only movement for transporting a load, which may comprise adding additional movements to the schedule within the planned available capacity.

In various embodiments, a schedule may be modified by adding a movement. For example, FIGS. 7J, 7K, and 7L show an example schedule, an example load time window, and an example modified schedule that has had a movement added. For example, schedules starting at, for example, location A may be identified. It may then be determined if the transportation of the load from location A to location B within the load time window may be completed, any required turn around activity may be completed, and the driver may return to location A in time to begin the previously scheduled movements. In some embodiments, unassigned time may also be added to the schedule. In particular, unassigned time may be added to account for any extra time between the driver's return to location A and the departure time of the previously scheduled movements. Unassigned time may also be used to ensure that a schedule includes no more than the maximum time length of driving within a day or 24 hour period. The planning system 100 may be configured to verify that no more than 14 hours of unassigned time are added to a schedule and that a modified schedule is less than 7 days in length. Similarly, an extra movement may be added to the end of a shift or unassigned time may be replaced with a load. In some embodiments, an empty movement may be added prior to movement of the load when a schedule is modified by adding movements. For example, a schedule ending at location A may have an empty movement added at the end of the schedule to location E where a load is picked up and then transported to location F. The modified schedule then concludes with an empty movement from location F to location A. For example, a schedule may be modified to insert a load by adding one or more movements to a schedule.

As should be understood, various combinations of direct, indirect, and added movement modifications may be made to one or more schedules to facilitate transportation of a load through a transportation network. In the embodiment illustrated in FIG. 4, only schedules which have an open/available capacity that may accommodate the load without the schedule being modified are considered at step 408 (modifications to one or more schedules may be considered at step 422).

Continuing to step 412, potential solutions are identified for each path. For example, the planning system 100 may identify potential solutions for each path. For example, the potential schedules for each leg/segment may be compiled/combined to create a self-consistent plan for transporting the load from the origin location to the destination location in accordance with the leave/departure time and the arrive/arrival time associated with the load information/data corresponding to the load. For example, one potential solution may be along the path shown as a solid line in FIG. 6. Schedule 1, identified as a potential schedule at step 408, may have an open/available capacity to move the load from location A to location C in accordance with the time window of the load for the location A to location C leg/segment of the path. Schedules 2 and 3 may have been identified as potential schedules at step 408 for moving the load from location C to location F. However, Schedule 2 may be scheduled to leave location C before Schedule 1 is scheduled to arrive at location C (or does not provide enough time to assure a clean transition at location C). Schedule 3 may be scheduled to leave location C an hour after Schedule 1 is to arrive at location C. Thus, one potential solution is for Schedule 1 to transport the load from location A to location C and Schedule 3 to transport the load from location C to location F.

At step 414, as shown in FIG. 4, it is determined whether at least one potential solution has been found. For example, the planning system 100 may determine whether at least one potential solution for transporting the load from the origin location to the destination location through the transportation network via existing schedules has been identified. If it is determined at step 414 that at least one solution has been identified, each potential solution is ranked at step 416. For example, the planning system 100 may rank each identified solution. In various embodiments, each potential solution may be ranked based at least in part on at least one of cost to transport the load according to the potential solution, miles traveled along the potential solution, special handling instructions associated with the load information/data corresponding to the load, time of arrival at the destination location, number of potential schedules that would need to be modified, time of departure from the origin location, time of arrival at least one of the intermediate points, time of departure from at least one of the intermediate points, expected weather conditions along at least one leg/segment, and extent of modification of at least one potential schedule. For example, if a snow storm is expected to affect one leg/segment of a proposed solution, that potential solution may receive a lower ranking than it otherwise might. If a first potential solution that requires the load to be transported 100 miles further than a second potential solution, than the second potential solution may receive a higher ranking than the first potential solution. Thus, the potential solutions may be ranked independently and/or comparatively in various embodiments.

At step 418, the ranked potential solutions are provided and displayed. For example, the planning system 100 may provide the potential solutions and/or solution information/data associated with the potential solutions to the user computing entity 10 and cause the user computing entity 10 to display at least one potential solution and at least a portion of the solution information/data associated therewith. In various embodiments, the potential solution and/or solution information/data may be displayed in a manner that indicates the ranking of the potential solution. For example, the highest ranked potential solution may be displayed at the top of the page or may be designated as the highest ranked potential solution via a visual (e.g., text, image, color, and/or other visual) cue. In various embodiments, the at least one potential solution and/or portion of the solution data/information associated therewith may be displayed via a user interface (e.g., via the user computing entity 10).

FIG. 8 illustrates an example solution selection interface 550. The solution selection interface 550 comprises a load identifying information/data portion 555. For example, the solution selection interface 550 may comprise a portion configured to display the load identifier and/or a portion of the load information/data stored in association with the load identifier corresponding to the load to be inserted into the transportation plan. For example, the load identifying information/data may comprise the load identifier, the origin location, the leave/departure time, the destination location, and/or the arrive/arrival time corresponding to the load. For each potential solution displayed, a solution summary 560a, b may be provided. In various embodiments, solution details 565 or minimized solution details 570 may be provided. For example, a user may have selected the detail expander 562 to cause the solution details 565 associated with Route 1 to be displayed.

In the illustrated solution selection interface 550, the potential solutions, or routes, are displayed in order of ranking with the highest ranking solution displayed first. The user may (e.g., operating a user computing entity 10) provide input indicating the load should be routed along a particular solution by selecting/clicking/pressing the select button 568 associated with the user preferred solution. For example, the user may (e.g., operating a user computing entity 10) request that the load be assigned to the potential schedules of potential solution Route 1 by selecting/pressing/clicking select button 568. In other embodiments, the load may be automatically assigned to a potential solution (e.g., the highest ranking potential solution).

Thus, returning to FIG. 4, at step 420, the load is assigned to the one or more schedules corresponding to the user selected potential solution and/or the highest ranked potential solution. For example, the planning system 100 may receive input indicating user selection of a potential solution (e.g., the user operating the user computing entity 10 may press/select/click the select button 568) and, possibly responsive thereto, assign the load to the schedules corresponding to the user-selected potential solution. In another example, the planning system 100 may automatically assign the load to the highest ranked potential solution. In some embodiments, the load may be automatically assigned to a particular solution (e.g., the highest ranking solution). In some embodiments, if user input selecting a particular solution is not received within a particular time frame the load may be automatically assigned to a particular solution. For example, the time frame may comprise a half hour or hour after the potential solutions are displayed, up to an hour before the first schedule of a potential solution is set to begin, and/or the like. Thus, the load may be assigned to the schedules comprising a potential solution, thereby inserting the load into the transportation plan, and the load may be subsequently transported through the transportation network accordingly.

In various embodiments, after the load has been assigned to one or more schedules, load information/data and/or updated schedule information/data may be provided to one or more mobile devices 20. For example, each driver and/or schedule may be associated with a mobile device 20. Updated schedule information/data for a particular schedule and/or any load information/data relevant to the particular schedule (e.g., the load identifier, where the driver is to pick up the load, where the driver is to leave the load, any special handling instructions associated with the load, and/or the like) may be provided (e.g., transmitted via a wired or wireless network) to the mobile device 20 associated with the particular schedule or the driver of a particular schedule.

Returning to step 414, if it is determined that at least one potential solution has not been identified, the process continues to step 422 wherein it is determined if one or more schedules may be modified to provide a potential solution. For example, the planning system 100 may determine if one or more schedules may be modified to provide a complete potential solution (e.g., a solution that would transport the load from the origin location to the destination location). As described above, if a schedule has a planned movement with an open/available capacity for particular leg/segment that does not exactly line up with the time window of a load for the particular leg/segment, the schedule may be modified to accommodate the time requirements of the load. For example, if the other portions of the schedule are not negatively affected (e.g., all the other movements of the schedule may be completed in an appropriate time frame), a schedule may be shifted to begin earlier, begin later, to include shift time and/or down time, to not include shift time and/or down time, and/or the like. If it is determined at step 422 that one or more schedules may be modified in an acceptable manner (e.g., none of the other portions of the schedules will be negatively affected by the modification) to provide at least one complete potential solution, the process may continue to step 416.

If it is determined at step 422 that one or more schedules cannot be modified to provide at least one potential solution, one or more partial potential solutions and/or associated solution information/data may be provided and/or a portion thereof displayed. In various embodiments, a partial potential solution may be a potential solution that accounts for transporting a load from the origin location to a location that is closer to the destination location than the origin location but that does not account for transporting the load to the destination location. For example, the planning system 100 may provide solution information/data for one or more partial potential solutions and cause display thereof. For example, the user computing entity 10 may display at least a portion of solution information/data corresponding to a partial potential solution. In various embodiments, the one or more partial potential solutions may be ranked, as described above, and may be displayed in a manner that indicates the ranking of the partial solutions. In some embodiments, a user (e.g., operating a user computing entity 10) may provide input selecting a partial solution and, in response thereto, the load may be assigned to the schedules corresponding to the user-selected partial solution. In some embodiments, the load may be automatically assigned to the highest ranking potential solution, even if the solution is a partial solution.

2. Alternative Method for Inserting a Load into a Transportation Plan

FIG. 9 provides a flowchart illustrating an alternative method for inserting a new or unassigned load into a transportation plan. Starting at step 902, a load insertion request is received. For example, the planning system 100 may receive a load insertion request. For example, a user (e.g., operating a user computing entity 10) may submit and/or initiate a load insertion request. In various embodiments, the load insertion request may be submitted and/or initiated in a manner similar to that described above.

At step 904, an available movement network may be built/generated/determined. For example, the planning system 100 may build an available movement network. In various embodiments, the available movement network may be a network of scheduled movements having an open/available capacity. For example, a plurality of schedules may include a portion or leg/segment having an open/available capacity. For example, a schedule may have an empty leg/segment, wherein no loads or trailers are assigned the schedule, a trailer only leg/segment, wherein an empty trailer is assigned to the schedule, or a single leg/segment that is eligible for a double leg/segment, wherein only one trailer is currently planned to be transported along a leg/segment but the schedule is capable of accommodating two trailers along the leg/segment. Thus, existing schedules may comprise open capacities that may be leveraged to transport the new, unassigned, or reassigned load through the transportation network from the origin location to the destination location. Thus, the legs/segments of schedules having an open/available capacity that may be used to transport the load are identified and combined to build the available movement network.

At step 906, a plurality of paths from the origin location to the destination location and through the available movement network are determined and/or identified. For example, the planning system 100 may determine and/or identify a plurality of paths through the available movement network. For example, schedule portions/legs/segments of the available movement network may be combined to provide paths from the origin location to the destination location. For example, the n shortest paths may be found. In another embodiment, all paths through the available movement network having a total travel distance of no more than a configurable threshold distance or ratio more than the shortest path through the available movement network are determined and/or identified. For example, only paths no longer than 200, 100, or 50 miles longer than the shortest path are considered. In another example, only paths that are less than 20%, 15%, 10%, or 5% longer than the shortest path are considered.

At step 908, the plurality of paths through the available movement network are each ranked. For example, the planning system 100 may rank each and/or some of the plurality of paths through the available movement network. In various embodiments, the paths may be ranked similar to that described above. For example, the paths may be independently or comparatively ranked.

At step 910, at least one path through the available movement network and/or path information/data associated therewith may be provided and/or displayed. For example, the planning system 100 may provide path information/data corresponding to one or more paths through the available movement network to the user computing entity 10 and cause the user computing entity 10 to display at least a portion of the path information/data. For example, at least a portion of the path information/data corresponding to one path may be displayed, via an interface similar to solution selection interface 550. Similar to that described above, if no complete solution is found, modification of one or more schedules may be considered and/or solution information/data associated with one or more partial solutions may be provided and/or displayed.

At step 912, the new, unassigned, and/or reassigned load is assigned to one or more schedules. For example, the planning system 100 may assign the new and/or unassigned load to one or more schedules. In particular, the new and/or unassigned load may be assigned to the schedules of a user-selected and/or automatically selected solution. For example, via a user interface similar to the solution selection interface 550, a user may provide input indicating user selection of a solution for the load to be routed along. In another example, the load may be automatically routed via the solution having the highest ranking. For example, the load may be automatically assigned to the schedules comprising the highest ranking solution. Thus, the new, unassigned, and/or reassigned load may be inserted into the transportation plan and transported through the transportation network from the origin location to the destination location in accordance therewith.

3. Deleting a Schedule from the Transportation Plan

In various scenarios, a user (e.g., employee or associate of a carrier) may desire to delete one or more schedules from a transportation plan. For example, a driver may call in sick or may be out on vacation, or the user may (e.g., operating a user computing entity 10) wish to use fewer schedules to increase efficiency, and/or the like. FIG. 10 provides a flowchart illustrating various processes and procedures that may be completed to delete a schedule from a transportation plan.

Starting at step 1002, input is received identifying a schedule to be deleted. For example, the planning system 100 may receive input identifying a schedule to be deleted. For example, a user (e.g., operating a user computing entity 10) may provide input via a schedule deletion request interface (e.g., displayed via the user computing entity 10).

An example, schedule deletion request interface 1100 is illustrated in FIG. 11. The schedule deletion request interface 1100 comprises a date form field 1105, schedule identifier form field 1110, a number of schedules to be deleted selector 1120, and a submit button 1130. The date form field 1105 may be configured to receive input and/or a user selection of a particular date or set of dates for which the schedule is to be deleted. If the date form field 1105 is left blank, the planning system 100 may permanently delete the identified schedule. The schedule identifier form field 1110 is configured to receive user input and/or selection of a schedule identifier. For example, each schedule may be uniquely identified by a schedule identifier. A particular schedule identifier, or multiple particular schedule identifiers, may be provided via the schedule identifier form field 1110 to indicate that the user wishes to delete at least one of the indicated schedules. In some embodiments, as will be discussed below, the user may (e.g., operating a user computing entity 10) indicate a set of schedules (e.g., all the schedules associated with the Atlanta hub or having the Atlanta hub as the home hub) and one or more schedules that can be deleted may be identified, determined, and/or the like. The number of schedules to be deleted selector is configured to receive input from a user and/or a user selection of how many schedules the user wishes to delete. For example, the user may (e.g., operating a user computing entity 10) enter two schedule identifiers with hopes to delete one of the two identified schedules and/or the user may (e.g., operating a user computing entity 10) wish to see how many schedules of a set of schedules may be deleted (e.g., to gauge efficiency and/or the like). A user may submit and/or initiate the schedule deletion request by selecting/pressing/clicking the submit button 1130. Thus, a schedule deletion request and/or other input identifying one or more schedules to be deleted is received.

Returning to FIG. 10, at step 1004, the loads identified with a schedule to be deleted during the identified time frame are identified. For example, the planning system 100 may identify one or more loads assigned to a schedule to be deleted for the time frame indicated by the user input to the date form field 1105. At step 1006, it may be determined if each of the loads assigned to a schedule to be deleted can be reassigned to existing schedules. For example, the planning system 100 may determine if the identified loads may be reassigned to other schedules. For example, either of the methods described above for inserting a load into a transportation plan may be automatically initiated to determine if the loads assigned to a schedule to be deleted can be reassigned to existing schedules. If a complete solution can be identified for a load, it is determined that the load can be reassigned.

If, at step 1006, it is determined that not every load assigned to the schedule to be deleted can be reassigned (e.g., a complete solution cannot be identified for at least one load assigned to the schedule), then the process continues to step 1008. At step 1008, information/data regarding the inability to reassign one or more loads is provided and/or displayed. For example, the planning system 100 may provide information/data regarding one or more loads that cannot be reassigned to the user computing entity 10 and cause the user computing entity 10 to display at least part of the information/data regarding the load that cannot be reassigned and/or indicating the schedule cannot be deleted.

If, at step 1006, it is determined that each load assigned to the schedule to be deleted may be reassigned (e.g., a complete solution is found for each load), the process continues to step 1010. At step 1010, information/data regarding the reassignment of the loads is provided and displayed. For example, the planning system 100 may provide information/data regarding the reassignment of the loads associated with the schedule to be deleted to the user computing entity 10 and cause the user computing entity 10 to display at least a portion of the reassignment information/data.

FIG. 12 illustrates an example reassignment confirmation interface 1150. The reassignment confirmation interface 1150 comprises a schedule(s) to be deleted identifier portion 1160, load reassignment information/data portion 1170, a submit button 1180 for confirming the deletion of the schedule(s) and a cancel button 1185 for cancelling deletion of the schedule(s). For example, the schedule(s) to be deleted identifier portion 1160 may display one or more schedule identifiers corresponding to one or more schedules to be deleted. In the illustrated example, schedules ATL123 and ATL321 are to be deleted. The load reassignment information/data portion 1170 provides information/data regarding how the loads associated with each schedule to be deleted will be reassigned. For example, Load X678876 that was assigned to Schedule ATL123 will be reassigned to schedule ATL890 which had previously been scheduled to have a trailer only movement between Atlanta and Charlotte at a time corresponding to the appropriate time window for Load X678876. Similarly, Load 234DFG will be assigned to what was previously an empty movement for schedule KNO465 and Load B632156 will be transported as part of a double leg/segment of schedule ATL234. The user may (e.g., operating a user computing entity 10) confirm deletion of the schedules and cause the associated loads to be reassigned as indicated by selecting/pressing/clicking the submit button 1180. The user may (e.g., operating a user computing entity 10) cancel the deletion of the schedules by selecting/pressing/clicking the cancel button 1185.

In various embodiments, multiple solutions for reassigning one or more loads may be identified. The solutions may be ranked as described above, in some embodiments. The user may (e.g., operating a user computing entity 10) be asked to choose from the (ranked) solutions or the highest ranking solution may be provided to the user for confirmation. For example, in various embodiments, the user may (e.g., operating a user computing entity 10) be given options for which schedule a load will be reassigned to. In such embodiments, the reassignment confirmation interface may display multiple reassignment options for one or more loads and a select button or other method for the user to provide input indicating user-selection of a particular reassignment option.

At step 1012, after receiving input from the user confirming the deletion of the schedule(s), the loads formerly assigned to the schedule(s) to be deleted during the time frame indicated by the user input to the date field form 1105 are reassigned to the user confirmed reassignments and the schedule(s) are deleted. In some embodiments, user confirmation of the deletion may not be required.

At step 1014, reassignment information/data may be provided to one or more mobile computing devices 20. For example, the planning system 100 may provide reassignment information/data corresponding to a load to be reassigned to a schedule to the mobile computing device 20 associated with the reassigned schedule and/or the driver thereof. For example, as described above, load information/data corresponding to a reassigned load may be provided to a mobile computing device 20 to provide the necessary information/data for a driver of a schedule to transport the load as reassigned. The reassigned load(s) may then be transported in accordance with the reassignment information/data.

4. Identifying One or More Schedules to Delete from a Transportation Plan

In various scenarios, a user may wish to identify one or more schedules that may be deleted from a transportation plan. FIG. 13 provides a flowchart illustrating various processes and procedures that may be completed to identify one or more schedules that may be deleted from a transportation plan. Starting at step 1302, input is received requesting schedule deletion. For example the planning system 100 may receive input requesting deletion of one or more schedules. For example, a user (e.g., operating a user computing entity 10) may submit a schedule deletion request interface 1100 to request a schedule deletion. For example, the request for schedule deletion may comprise information/data identifying a set of schedules to be considered (e.g., all the schedules associated with the Atlanta hub and/or having the Atlanta hub as the schedule home hub), a goal number of schedules to be deleted (e.g., 1, 2, 3, how many schedules can I delete?), and/or a date or set of dates for which the schedules are to be deleted. In various embodiments, at most the goal number of schedules to be deleted will be returned. In other embodiments, all of the schedules that may be deleted are returned and the user may (e.g., operating a user computing entity 10) select which schedules to delete to achieve deletion of the goal number of schedules to be deleted.

At step 1304, the loads assigned to each schedule of the set of schedules for the indicated time frame are identified. For example, the planning system 100 may identify the loads assigned to each schedule of the set of schedules during the indicated time frame. At step 1306, it is determined if all of the loads of a particular schedule of the set of schedules can be reassigned. For example, either of the methods for inserting a load into a transportation plan described above may be automatically initiated to determine if a complete solution for each load associated with a particular schedule can be reassigned. In various embodiments, each schedule of the set of schedules may be serially considered to prevent multiple loads from being reassigned to the same leg/segment of one schedule. In other embodiments, two or more schedules of the set of schedules may be considered in parallel and a self-consistency check may be completed before a solution is provided to the user. If a complete solution for reassigning each load associated with a particular schedule is found, the particular schedule may be identified as a potential schedule for deletion.

At step 1308, each schedule identified as a potential schedule for deletion is ranked. For example, the planning system 100 may rank each schedule identified as a potential schedule for deletion. For example, each load reassignment may be ranked as described above and the load reassignment rank for each load currently assigned to a potential schedule for deletion may be combined to provide a schedule rank.

At step 1310, the potential schedules for deletion and/or schedule and/or reassignment information/data associated therewith is provided and displayed. For example, the planning system 100 may provide information/data associated with the potential schedules for deletion and the corresponding reassignment information/data to the user computing entity 10 and cause the user computing entity 10 to display at least a portion of the provided information/data. For example, the user computing entity 10 may display information/data corresponding to the potential schedules for deletion and/or the corresponding load reassignments via a user interface similar to the reassignment confirmation interface 1150. In an example scenario, three schedules are identified as potential schedules for deletion: Schedule 1, Schedule 2, and Schedule 3. For Schedule 1 to be reassigned, one of the loads currently assigned to Schedule 1 would need to be reassigned to Schedule 3. Thus, if the user wishes to delete two schedules, the user cannot select to delete Schedule 1 and Schedule 3. The provided user interface may indicate that the user must select to delete Schedule 1 and Schedule 2 or Schedule 2 and Schedule 3 but cannot select to delete Schedule 1 and Schedule 3.

At step 1312, loads formerly assigned to the schedules to be deleted are reassigned and the schedules to be deleted are deleted. For example, the planning system 100 may reassign the loads formerly assigned to the schedules to be deleted and then delete the schedules to be deleted. In various embodiments, step 1312 may be completed in response to receiving user input confirming deletion of one or more schedules. Reassignment information/data may be provided to one or more mobile computing devices 20. For example, the planning system 100 may provide reassignment information/data corresponding to a load to be reassigned to a schedule to the mobile computing device 20 associated with the reassigned schedule and/or the driver associated therewith. For example, as described above, load information/data corresponding to a reassigned load may be provided to a mobile computing device 20 to provide the necessary information/data for a driver of a schedule to transport the load as reassigned. The reassigned load(s) may then be transported in accordance with the reassignment information/data.

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for managing a transportation network, comprising:
- (a) receiving, by one or more computing devices communicating with one or more user computing entities and one or more mobile computing devices through a computer network, a request to remove a plurality of schedules from a set of schedules in the transportation network, wherein the request includes at least an identification of the plurality of schedules to be removed;
- (b) for a first schedule of the set of schedules:
  - (i) identifying, by the one or more computing devices, each load assigned to the first schedule;
  - (ii) determining, by the one or more computing devices, whether at least one potential replacement schedule can be identified for each load assigned to the first schedule based on a level of near real-time remaining load capacity of the at least one potential replacement schedule, wherein the at least one potential replacement schedule meets the commitments of each load assigned to the first schedule; and:
    - (1) responsive to determining that at least one potential replacement schedule cannot be identified, generating, by the one or more computing devices, a first indication in a first user interface that the first schedule cannot be removed and transmitting in real-time the first indication through the computer network to the one or more user computing entities and one or more mobile computing devices for display via the first user interface that enables a user to manage the transportation network, wherein providing the first indication displays information regarding one or more loads assigned to the first schedule that cannot be reassigned and at least part of the information regarding the load that cannot be reassigned indicating that the first schedule cannot be deleted; and (2) responsive to determining that at least one potential replacement schedule can be identified, generating, by the one or more computing devices, a second indication in a second user interface and transmitting in real-time the second indication through the computer network to the one or more user computing entities and one or more mobile computing devices for display via the second user interface that enables a user to manage the transportation network, wherein the second indication indicates that the first schedule can be removed and also provides a ranking of the at least one potential replacement schedule and identifies a highest ranked potential replacement schedule based on at least one of cost to transport the load, miles that will be traveled, special handling instructions associated with the load information, time of arrival at a destination location, number of potential schedules that would need to be modified, time of departure, expected weather conditions, or an extent of modification of a schedule, wherein providing the second indication displays potential reassignment information regarding one or more reassignments of the loads assigned to the first schedule to be removed, wherein the potential reassignment information includes identification of the first schedule to be deleted and how each of the one or more loads assigned to the first schedule will be reassigned to the ranked at least one potential replacement schedule in a manner that indicates the ranking of the ranked at least one potential replacement schedule;

(A) responsive to receiving input indicative of a selection of one of the ranked at least one potential replacement schedule within a particular time frame after the ranked at least one potential replacement schedule is displayed and before a start time of a first schedule of the ranked at least one potential replacement schedule, reassigning, by the one or more computing device, the one or more loads to the schedule of the selected at least one potential replacement schedule and updating the schedule of the selected at least one potential replacement schedule;

(B) responsive to not receiving input within a particular time frame after the ranked at least one potential replacement schedule is displayed and before the start time of the first schedule of the ranked at least one potential replacement schedule, automatically reassigning, by the one or more computing devices, the load to the schedule of one of the highest ranked at least one potential replacement schedule and updating the schedule of the highest ranked at least one potential replacement schedule;

(C) removing, by the one or more computing devices, the plurality of schedules from the set of schedules in the transportation network; and (D) displaying in real time, by the one or more computing devices, via the at least one of one or more user computing entities and the one or more mobile computing devices by generating and transmitting a third user interface over the computer network, wherein the third user interface is configured to display reassignment information regarding the one of the at least one replacement schedule to which the one or more loads have been reassigned.

2. The method of claim 1 further comprising reassigning the loads assigned to one or more schedules of the set of schedules.

3. The method of claim 2, wherein the reassigning is in response to receiving input confirming removal of the one or more schedules of the set of schedules.

4. The method of claim 2 further comprising providing information regarding the reassignment of the load to at least one mobile device associated with the reassigned schedule.

5. The method of claim 1, further comprising ranking each of the schedules that may be removed and providing the ranking for display via the interface, wherein the ranking is based on a count of schedules modified to remove a particular schedule.

6. The method of claim 1, wherein the characteristics of the second schedule comprises that the second schedule is an only schedule to accommodate a reassignment of a segment of the first schedule.

7. The method of claim 1, wherein a potential replacement schedule comprises at least one of an empty leg, a trailer only leg, or a single trailer leg corresponding to the leg assigned to the particular schedule for the load.

* * * * *

UNITED STATES PATENT AND TRADEMARK OFFICE
CERTIFICATE OF CORRECTION

PATENT NO. : 10,679,311 B2
APPLICATION NO. : 15/017038
DATED : June 9, 2020
INVENTOR(S) : Douglas K. Mohr et al.

Page 1 of 1

It is certified that error appears in the above-identified patent and that said Letters Patent is hereby corrected as shown below:

In the Claims

In Column 30, Line 57, Claim 1, delete "and:" and insert -- and --, therefor.

Signed and Sealed this
Eighteenth Day of August, 2020

Andrei Iancu
*Director of the United States Patent and Trademark Office*